US012365046B2

United States Patent
Konno et al.

(10) Patent No.: US 12,365,046 B2
(45) Date of Patent: Jul. 22, 2025

(54) FRICTION STIR SPOT WELDER AND FRICTION STIR SPOT WELDING METHOD

(71) Applicant: KAWASAKI JUKOGYO KABUSHIKI KAISHA, Kobe (JP)

(72) Inventors: Yutaro Konno, Tokyo (JP); Masahiro Miyake, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 18/015,149

(22) PCT Filed: Jul. 7, 2021

(86) PCT No.: PCT/JP2021/025648
§ 371 (c)(1),
(2) Date: Jan. 9, 2023

(87) PCT Pub. No.: WO2022/009928
PCT Pub. Date: Jan. 13, 2022

(65) Prior Publication Data
US 2023/0249281 A1 Aug. 10, 2023

(30) Foreign Application Priority Data
Jul. 9, 2020 (JP) ................................ 2020-118486

(51) Int. Cl.
*B23K 20/12* (2006.01)
(52) U.S. Cl.
CPC ........ *B23K 20/1265* (2013.01); *B23K 20/125* (2013.01)

(58) Field of Classification Search
CPC ................ B23K 20/1265; B23K 20/125; B23K 20/123; B23K 20/122–128
USPC ................ 228/112.1, 2.1, 102–103, 8–12
See application file for complete search history.

(56) References Cited

U.S. PATENT DOCUMENTS

| | | | |
|---|---|---|---|
| 2003/0047590 A1* | 3/2003 | Okamoto | B23K 20/123 228/127 |
| 2006/0124691 A1* | 6/2006 | Wood | B23K 20/1265 228/2.1 |
| 2011/0073258 A1* | 3/2011 | Christ | B23K 20/129 228/2.1 |
| 2014/0069986 A1 | 3/2014 | Okada et al. | |

(Continued)

FOREIGN PATENT DOCUMENTS

| | | | | |
|---|---|---|---|---|
| CN | 102744514 A | * | 10/2012 | ........... B23K 20/126 |
| CN | 103801819 A | * | 5/2014 | ......... B23K 20/1265 |

(Continued)

*Primary Examiner* — Kiley S Stoner
(74) *Attorney, Agent, or Firm* — Oliff PLC

(57) ABSTRACT

A friction stir spot welder includes: a pin; a shoulder; a rotary driver; a tool driver; and circuitry that performs an operation of driving the rotary driver and the tool driver such that the pin and the shoulder press a workpiece by a first pressing force while rotating at a first rotational frequency, and after the operation, performs an operation of driving the rotary driver and the tool driver such that a tip of the shoulder in a rotating state is pressed in to a first position. The first position is a position corresponding to 46% or more of a thickness of the workpiece from a front surface of the workpiece. A press-in speed of the shoulder until the shoulder reaches the first position is a constant speed.

8 Claims, 16 Drawing Sheets

(56) References Cited

U.S. PATENT DOCUMENTS

| | | | |
|---|---|---|---|
| 2020/0282491 A1 | 9/2020 | Haruna et al. | |
| 2021/0053146 A1* | 2/2021 | Yapici | B23K 20/1245 |
| 2023/0143286 A1* | 5/2023 | Rodriguez Suarez | B23K 20/22 228/2.1 |

FOREIGN PATENT DOCUMENTS

| | | | |
|---|---|---|---|
| CN | 104227225 A * | 12/2014 | B23K 1/00 |
| CN | 104507631 A * | 4/2015 | B23K 20/1245 |
| CN | 104942427 A * | 9/2015 | B23K 20/1225 |
| CN | 105108310 A * | 12/2015 | |
| CN | 105108312 A * | 12/2015 | |
| CN | 105108315 A * | 12/2015 | |
| CN | 105108361 A * | 12/2015 | |
| CN | 102554454 B * | 5/2017 | |
| CN | 107442927 A * | 12/2017 | B23K 20/1245 |
| CN | 108941880 A * | 12/2018 | B23K 20/1225 |
| CN | 109175669 A * | 1/2019 | |
| CN | 110587114 A * | 12/2019 | |
| CN | 110860782 A * | 3/2020 | B23K 20/122 |
| CN | 212043114 U * | 12/2020 | |
| CN | 115302072 A * | 11/2022 | |
| EP | 1846191 B1 * | 9/2013 | B23K 20/125 |
| EP | 3533556 B1 * | 11/2022 | B23K 20/12 |
| JP | 2007030017 A * | 2/2007 | |
| JP | 2007313520 A * | 12/2007 | |
| JP | 2010269367 A * | 12/2010 | |
| JP | 2012-196682 A | 10/2012 | |
| JP | 2015180513 A * | 10/2015 | B23K 20/122 |
| JP | 2017164788 A * | 9/2017 | B23K 20/12 |
| JP | 2020108902 A * | 7/2020 | B23K 20/122 |
| KR | 101286681 B1 * | 7/2013 | |
| WO | WO-2006115108 A1 * | 11/2006 | B23K 20/125 |
| WO | WO-2012127832 A1 * | 9/2012 | B23K 20/122 |
| WO | WO-2012127833 A1 * | 9/2012 | B23K 20/002 |
| WO | WO-2016063538 A1 * | 4/2016 | B23K 20/12 |
| WO | WO-2016098341 A1 * | 6/2016 | B23K 20/122 |
| WO | WO-2019049813 A1 * | 3/2019 | B23K 20/002 |
| WO | WO-2019049814 A1 * | 3/2019 | B23K 20/1245 |
| WO | WO-2019049892 A1 * | 3/2019 | B23K 20/122 |
| WO | WO-2019049894 A1 * | 3/2019 | B23K 20/122 |
| WO | WO-2019050002 A1 * | 3/2019 | B23K 20/122 |
| WO | WO-2020138326 A1 * | 7/2020 | B23K 20/123 |
| WO | WO-2020179661 A1 * | 9/2020 | B23K 20/125 |

* cited by examiner

FRICTION STIR SPOT WELDER AND FRICTION STIR SPOT WELDING METHOD

This is a National Phase of International Application No. PCT/JP2021/025648 filed Jul. 7, 2021, which claims priority to Japanese Application No. 2020-118486 filed Jul. 9, 2020. The disclosure of the prior applications is hereby incorporated by reference herein in its entirety.

TECHNICAL FIELD

The present disclosure relates to a friction stir spot welder and a friction stir spot welding method.

BACKGROUND ART

In transportation machines, such as automobiles, railcars, and aircrafts, resistance spot welding or rivet joining has been used to couple metal materials to each other. However, in recent years, a method (friction stir spot welding method) of joining metal materials by utilizing frictional heat is gathering attention (see PTL 1, for example).

In the friction stir spot welding method disclosed in PTL 1, a substantially columnar pin and a substantially cylindrical shoulder including a hollow into which the pin is inserted are used to weld a workpiece, and a tool driver that operates (drives) the pin and the shoulder (tool) is controlled as below.

To be specific, the tool driver is controlled to reduce an absolute value of a tool average position Tx defined by a formula "Ap·Pp+As·Ps=Tx", where Ap denotes a sectional area of a tip surface of the pin, As denotes a sectional area of a tip surface of the shoulder, Pp denotes a press-in depth of the pin when the pin is pressed in a front surface of the workpiece, and Ps denotes a press-in depth of the shoulder when the shoulder is pressed in the front surface of the workpiece.

With this, satisfactory welding quality can be realized with a preferable degree of accuracy in accordance with welding conditions, and the generation of internal void defects can be prevented or suppressed.

CITATION LIST

Patent Literature

PTL 1: Japanese Laid-Open Patent Application Publication No. 2012-196682

SUMMARY OF INVENTION

Technical Problem

The present inventors have found that according to the friction stir spot welding method disclosed in PTL 1, when the press-in depth of the shoulder increases, a press-in speed decreases, and a welding time increases in some cases. Thus, the present inventors have arrived at the present disclosure.

An object of the present disclosure is to provide a friction stir spot welder and a friction stir spot welding method each of which suppresses an increase in a welding time when a double-acting friction stir spot welder welds a thick workpiece.

Solution to Problem

In order to solve the above problems, a friction stir spot welder according to the present disclosure includes: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The circuitry performs an operation (A) of driving the rotary driver and the tool driver such that the pin and the shoulder press a workpiece by a predetermined first pressing force while rotating at a preset and predetermined first rotational frequency. After the operation (A), the circuitry performs an operation (B) of driving the rotary driver and the tool driver such that a tip of the shoulder in a rotating state is pressed in to a preset and predetermined first position. The first position is a position corresponding to 46% or more of a thickness of the workpiece from a front surface of the workpiece. A press-in speed of the shoulder until the shoulder reaches the first position is a constant speed.

With this, even when welding a thick workpiece, the press-in speed of the shoulder can be made constant, and the welding time can be prevented from increasing.

Moreover, a friction stir spot welder according to the present disclosure includes: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The circuitry performs an operation (A) of driving the rotary driver and the tool driver such that the pin and the shoulder press a workpiece by a predetermined first pressing force while rotating at a preset and predetermined first rotational frequency. After the operation (A), the circuitry performs an operation (B) of driving the rotary driver and the tool driver such that a tip of the shoulder in a rotating state is pressed in to a preset and predetermined first position. When the shoulder presses the workpiece by the first pressing force, surface pressure of a tip surface of the shoulder is 200.71 to 254.65 MPa.

With this, even when welding a thick workpiece, the press-in speed of the shoulder can be made constant, and the welding time can be prevented from increasing.

Moreover, a friction stir spot welding method according to the present disclosure uses a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The friction stir spot welding method includes: performing, by the circuitry, an operation (A) of driving the rotary driver and the tool driver such that the pin and the shoulder press a workpiece by a predetermined first pressing force while rotating at a preset and predetermined first rotational frequency; and after the operation (A), performing, by the circuitry, an operation (B) of driving the rotary driver and the tool driver such that a tip of the shoulder in a rotating state is pressed in to a preset and predetermined first position. The first position is a position corresponding to 46% or more of a thickness of the workpiece from a front surface of the workpiece. A press-in speed of the shoulder until the shoulder reaches the first position is a constant speed.

With this, even when welding a thick workpiece, the press-in speed of the shoulder can be made constant, and the welding time can be prevented from increasing.

Moreover, a friction stir spot welding method according to the present disclosure uses: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The friction stir spot welding method includes: performing, by the circuitry, an operation (A) of driving the rotary driver and the tool driver such that the pin and the shoulder press a workpiece by a predetermined first pressing force while rotating at a preset and predetermined first rotational frequency; and after the operation (A), performing, by the circuitry, an operation (B) of driving the rotary driver and the tool driver such that a tip of the shoulder in a rotating state is pressed in to a preset and predetermined first position. When the shoulder presses the workpiece by the first pressing force, surface pressure of a tip surface of the shoulder is 200.71 to 254.65 MPa.

With this, even when welding a thick workpiece, the press-in speed of the shoulder can be made constant, and the welding time can be prevented from increasing.

The above object, other objects, features, and advantages of the present disclosure will be made clear by the following detailed explanation of preferred embodiments with reference to the attached drawings.

Advantageous Effects of Invention

In the friction stir spot welder and the friction stir spot welding method according to the present disclosure, even when welding a thick workpiece, the press-in speed of the shoulder can be made constant, and the welding time can be prevented from increasing.

DESCRIPTION OF EMBODIMENTS

Figure 1:
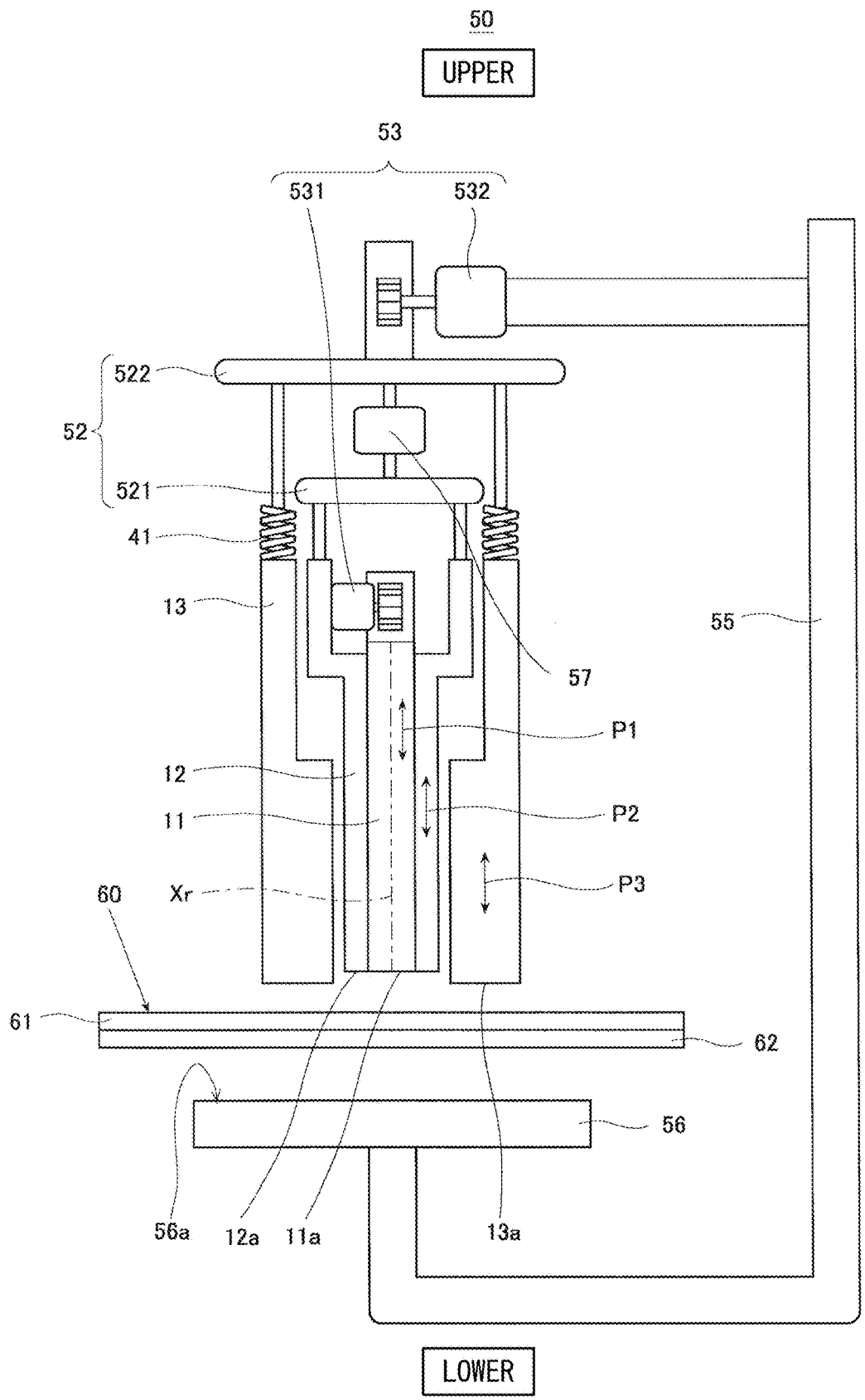
FIG. 1 is a schematic diagram showing a schematic configuration of a friction stir spot welder according to Embodiment 1.

Hereinafter, preferred embodiments of the present disclosure will be described with reference to the drawings. In the following description and the drawings, the same reference signs are used for the same or corresponding components, and the repetition of the same explanation is avoided. Moreover, in the drawings, components necessary to explain the present disclosure are shown, and the other component may be omitted. Furthermore, the present disclosure is not limited to the following embodiments.

Embodiment 1

A friction stir spot welder according to Embodiment 1 includes: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The circuitry performs an operation (A) of driving the rotary driver and the tool driver such that the pin and the shoulder press a workpiece by a predetermined first pressing force while rotating at a preset and predetermined first rotational frequency. After the operation (A), the circuitry performs an operation (B) of driving the rotary driver and the tool driver such that a tip of the shoulder in a rotating state is pressed in to a preset and predetermined first position. The first position is a position corresponding to 46% or more of a thickness of the workpiece from a front surface of the workpiece. A press-in speed of the shoulder until the shoulder reaches the first position is a constant speed.

Moreover, in the friction stir spot welder according to Embodiment 1, when the shoulder presses the workpiece by the first pressing force, surface pressure of a tip surface of the shoulder may be 200.71 to 254.65 MPa.

Moreover, a friction stir spot welder according to Embodiment 1 includes: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The circuitry performs an operation (A) of driving the rotary driver and the tool driver such that the pin and the shoulder press a workpiece by a predetermined first pressing force while rotating at a preset and predetermined first rotational frequency. After the operation (A), the circuitry performs an operation (B) of driving the rotary driver and the tool driver such that a tip of the shoulder in a rotating state is pressed in to a preset and predetermined first position. When the shoulder presses the workpiece by the first pressing force, surface pressure of a tip surface of the shoulder is 200.71 to 254.65 MPa.

Moreover, in the friction stir spot welder according to Embodiment 1, the first position may be a position corresponding to 46% or more of a thickness of the workpiece from a front surface of the workpiece, and a press-in speed of the shoulder until the shoulder reaches the first position may be a constant speed.

Moreover, in the friction stir spot welder according to Embodiment 1, the first position may be a position corresponding to 100% or less of the thickness of the workpiece from the front surface of the workpiece.

Moreover, a method of operating a friction stir spot welder according to Embodiment 1 is a method of operating a friction stir spot welder including: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The method includes: performing, by the circuitry, an operation (A) of driving the rotary driver and the tool driver such that the pin and the shoulder press a workpiece by a predetermined first pressing force while rotating at a preset and predetermined first rotational frequency; and after the operation (A), performing, by the circuitry, an operation (B) of driving the rotary driver and the tool driver such that a tip of the shoulder in a rotating state is pressed in to a preset and predetermined first position. The first position is a position corresponding to 46% or more of a thickness of the workpiece from a front surface of the workpiece. A press-in speed of the shoulder until the shoulder reaches the first position is a constant speed.

Moreover, in the method of operating the friction stir spot welder according to Embodiment 1, when the shoulder presses the workpiece by the first pressing force, surface pressure of a tip surface of the shoulder may be 200.71 to 254.65 MPa.

Moreover, a method of operating the friction stir spot welder according to Embodiment 1 is a method of operating a friction stir spot welder including: a pin that is columnar; a shoulder that is cylindrical, the pin being within the shoulder; a rotary driver that rotates the pin and the shoulder about an axis that coincides with a center axis of the pin; a tool driver that advances and retracts the pin and the shoulder along the axis; and circuitry. The method includes: performing, by the circuitry, an operation (A) of driving the rotary driver and the tool driver such that the pin and the shoulder press a workpiece by a predetermined first pressing force while rotating at a preset and predetermined first rotational frequency; and after the operation (A), performing, by the circuitry, an operation (B) of driving the rotary driver and the tool driver such that a tip of the shoulder in a rotating state is pressed in to a preset and predetermined first position. When the shoulder presses the workpiece by the first pressing force, surface pressure of a tip surface of the shoulder is 200.71 to 254.65 MPa.

Moreover, in the method of operating the friction stir spot welder according to Embodiment 1, the first position may be a position corresponding to 46% or more of a thickness of the workpiece from a front surface of the workpiece, and a press-in speed of the shoulder until the shoulder reaches the first position may be a constant speed.

Moreover, in the method of operating the friction stir spot welder according to Embodiment 1, the first position may be a position corresponding to 100% or less of the thickness of the workpiece from the front surface of the workpiece.

Hereinafter, one example of the friction stir spot welder according to Embodiment 1 will be described in detail with reference to the drawings.

Configuration of Friction Stir Spot Welder

FIG. 1 is a schematic diagram showing a schematic configuration of the friction stir spot welder according to Embodiment 1. An upper-lower direction in FIG. 1 is shown as an upper-lower direction of the friction stir spot welder.

As shown in FIG. 1, a friction stir spot welder 50 according to Embodiment 1 includes a pin 11, a shoulder 12, a tool fixture 52, a tool driver 53, a clamp structure 13, a backing support 55, a backing structure 56, and a rotary driver 57.

The pin 11, the shoulder 12, the tool fixture 52, the tool driver 53, the clamp structure 13, and the rotary driver 57 are located at an upper end of the backing support 55 including a C-shaped gun (C-shaped frame). Moreover, the backing structure 56 is located at a lower end of the backing support 55. The pin 11, the shoulder 12, the clamp structure 13, and the backing structure 56 are attached to the backing support 55 such that the pin 11, the shoulder 12, and the clamp structure 13 are opposed to the backing structure 56. A workpiece 60 is located between the pin 11 and the backing structure 56, between the shoulder 12 and the backing structure 56, and between the clamp structure 13 and the backing structure 56.

The pin 11, the shoulder 12, and the clamp structure 13 are fixed to the tool fixture 52 including a rotary tool fixture 521 and a clamp fixture 522. Specifically, the pin 11 and the shoulder 12 are fixed to the rotary tool fixture 521, and the clamp structure 13 is fixed to the clamp fixture 522 through a clamp driver 41. The rotary tool fixture 521 is supported by the clamp fixture 522 through the rotary driver 57. The clamp driver 41 includes springs.

Moreover, the pin 11, the shoulder 12, and the clamp structure 13 are driven by the tool driver 53 including a pin driver 531 and a shoulder driver 532, to advance and retract in the upper-lower direction.

The pin 11 has a columnar shape. Although not shown in FIG. 1 in detail, the pin 11 is supported by the rotary tool fixture 521. Moreover, the pin 11 is rotated by the rotary driver 57 about an axis Xr (rotation axis) that coincides with a center axis of the pin 11. Furthermore, the pin 11 can advance and retract by the pin driver 531 in a direction indicated by an arrow P1, i.e., in a direction along the axis Xr (in the upper-lower direction in FIG. 1).

The pin driver 531 may include, for example, a linear motion actuator. Examples of the linear motion actuator include: a servomotor and a rack-and-pinion structure; a servomotor and a ball screw; and an air cylinder.

The shoulder 12 has a cylindrical shape including a hollow and is supported by the rotary tool fixture 521. The pin 11 is located in the hollow of the shoulder 12. In other words, the shoulder 12 is located so as to surround an outer peripheral surface of the pin 11.

Moreover, the shoulder 12 is rotated by the rotary driver 57 about the same axis Xr as the pin 11. Furthermore, the shoulder 12 can advance and retract by the shoulder driver 532 in a direction indicated by an arrow P2, i.e., in the direction along the axis Xr.

The shoulder driver 532 may include, for example, a linear motion actuator. Examples of the linear motion actuator include: a servomotor and a rack-and-pinion structure; a servomotor and a ball screw; and an air cylinder.

As above, in the present embodiment, the pin 11 and the shoulder 12 (rotary tool) are supported by the rotary tool fixture 521 and are integrally rotated by the rotary driver 57 about the axis Xr. Moreover, the pin 11 can advance and retract by the pin driver 531 in the direction along the axis Xr, and the shoulder 12 can advance and retract by the shoulder driver 532 in the direction along the axis Xr.

In Embodiment 1, the pin 11 can independently advance and retract, and in addition, can advance and retract in accordance with the advancing and retracting of the shoulder 12. However, the pin 11 and the shoulder 12 may individually advance and retract.

As with the shoulder 12, the clamp structure 13 has a cylindrical shape including a hollow. The clamp structure 13 is located such that a center axis of the clamp structure 13 coincides with the axis Xr. The shoulder 12 is in the hollow of the clamp structure 13.

To be specific, the cylindrical shoulder 12 is located so as to surround the outer peripheral surface of the pin 11, and the cylindrical clamp structure 13 is located so as to surround an outer peripheral surface of the shoulder 12. In other words, the clamp structure 13, the shoulder 12, and the pin 11 constitute a coaxial nested structure.

Moreover, the clamp structure 13 presses one surface (front surface) of the workpiece 60. As described above, in Embodiment 1, the clamp structure 13 is supported by the clamp fixture 522 through the clamp driver 41. The clamp driver 41 biases the clamp structure 13 toward the backing structure 56. Then, the clamp structure 13 (and the clamp driver 41 and the clamp fixture 522) can advance and retract by the shoulder driver 532 in a direction indicated by an arrow P3 (which is the same as the direction indicated by the arrow P1 and the direction indicted by the arrow P2).

In Embodiment 1, the clamp driver 41 includes springs. However, the present embodiment is not limited to this. The clamp driver 41 may apply biasing force or pressure to the clamp structure 13. For example, a structure that utilizes gas pressure, hydraulic pressure, a servomotor, or the like may be suitably used.

The pin 11, the shoulder 12, and the clamp structure 13 respectively include a tip surface 11a, a tip surface 12a, and a tip surface 13a. Moreover, the pin 11, the shoulder 12, and the clamp structure 13 advance and retract by the tool driver 53 to bring the tip surface 11a, the tip surface 12a, and the tip surface 13a into contact with the front surface of the workpiece 60 (a welded portion of the workpiece 60) and press the workpiece 60.

Moreover, when the diameter of the tip surface 12a of the shoulder 12 is 9.0 mm, the diameter of the tip surface 11a of the pin 11 may be larger than 5.0 mm or may be 5.5 mm or larger in order to suppress a decrease in a press-in speed.

Moreover, when the diameter of the tip surface 12a of the shoulder 12 is 9.0 mm, the diameter of the tip surface 11a of the pin 11 may be 6.0 mm or smaller in order to suppress the breakage of the shoulder 12.

In other words, in order to suppress the decrease in the press-in speed, the area of the tip surface 12a of the shoulder 12 may be smaller than 43.98 mm$^2$ or may be 39.86 mm$^2$ or smaller. Moreover, in order to suppress the breakage of the shoulder 12, the area of the tip surface 12a of the shoulder 12 may be 35.34 mm$^2$ or larger.

In Embodiment 1, the backing structure 56 supports the workpiece 60 having a flat plate shape such that a flat surface (supporting surface 56a) of the backing structure 56 contacts a back surface of the workpiece 60. The configuration of the backing structure 56 is not especially limited as long as the backing structure 56 can appropriately support the workpiece 60 such that the friction stir spot welding can be performed. For example, the backing structures 56 of various shapes may be additionally prepared, and the backing structure 56 may be detachable from the C-shaped frame 55 and replaceable in accordance with the types of the workpieces 60.

The workpiece 60 includes two workpieces that are a plate-shaped first workpiece 61 and a plate-shaped second workpiece 62. The first workpiece 61 and the second workpiece 62 may be made of a metal material (such as aluminum or steel) or fiber reinforced plastic (such as carbon fiber reinforced plastic). Moreover, the thickness of the first workpiece 61 may be equal to or larger than the thickness of the second workpiece 62.

Embodiment 1 adopts a case where the workpiece 60 includes the plate-shaped first workpiece 61 and the plate-shaped second workpiece 62. However, the present embodiment is not limited to this. The shape of the workpiece 60 (the shape of the first workpiece 61 and the shape of the second workpiece 62) may be any shape and may be, for example, a rectangular solid shape or a circular-arc shape. Moreover, the workpiece 60 may include three or more workpieces.

Moreover, specific configurations of the pin 11, the shoulder 12, the tool fixture 52, the tool driver 53, the clamp structure 13, the backing support 55, and the rotary driver 57 in Embodiment 1 are not limited to the above-described configurations, and configurations widely known in the field of the friction stir welding may be suitably used. For example, each of the pin driver 531 and the shoulder driver 532 may include a motor, a gear mechanism, and the like known in the field of the friction stir welding.

Moreover, in Embodiment 1, the backing support 55 includes the C-shaped gun but is not limited to this. The backing support 55 may have any configuration as long as: the backing support 55 can support the pin 11, the shoulder 12, and the clamp structure 13 such that the pin 11, the shoulder 12, and the clamp structure 13 can advance and retract; and the backing support 55 can support the backing structure 56 at a position opposed to the pin 11, the shoulder 12, and the clamp structure 13.

Moreover, Embodiment 1 adopts a case where the clamp structure 13 is included. However, the present embodiment is not limited to this and may adopt a case where the clamp structure 13 is not included. In this case, for example, the clamp structure 13 may be detachable from the backing support 55 according to need.

Furthermore, the friction stir spot welder 50 according to Embodiment 1 is located at a friction stir spot welding robot system (not shown). Specifically, the backing support 55 is attached to a tip of an arm of the robot system.

Therefore, the backing support 55 can be regarded as being included in the friction stir spot welding robot system. A specific configuration of the friction stir spot welding robot system including the backing support 55 and the arm is not especially limited, and apparatuses, such as an articulated robot, known in the field of the friction stir welding can be suitably used.

The present embodiment is not limited to a case where the friction stir spot welder 50 (including the backing support 55) is applied to the friction stir spot welding robot system. The friction stir spot welder 50 (including the backing support 55) is suitably applicable to known processing apparatuses, such as NC machining apparatuses, large C-shaped frames, and automatic riveters.

Moreover, the friction stir spot welder 50 according to Embodiment 1 may be configured such that two or more robots make the backing structure 56 and portions of the friction stir spot welder 50 other then the backing structure 56 face each other. Furthermore, as long as the friction stir spot welder 50 can stably perform the friction stir spot welding with respect to the workpiece 60, the workpiece 60 may be of a handy type, or a robot may be used as a positioner for the workpiece 60.

Control Configuration of Friction Stir Spot Welder

Next, a control configuration of the friction stir spot welding apparatus 50 according to Embodiment 1 will be specifically described with reference to FIG. 2.

Figure 2:
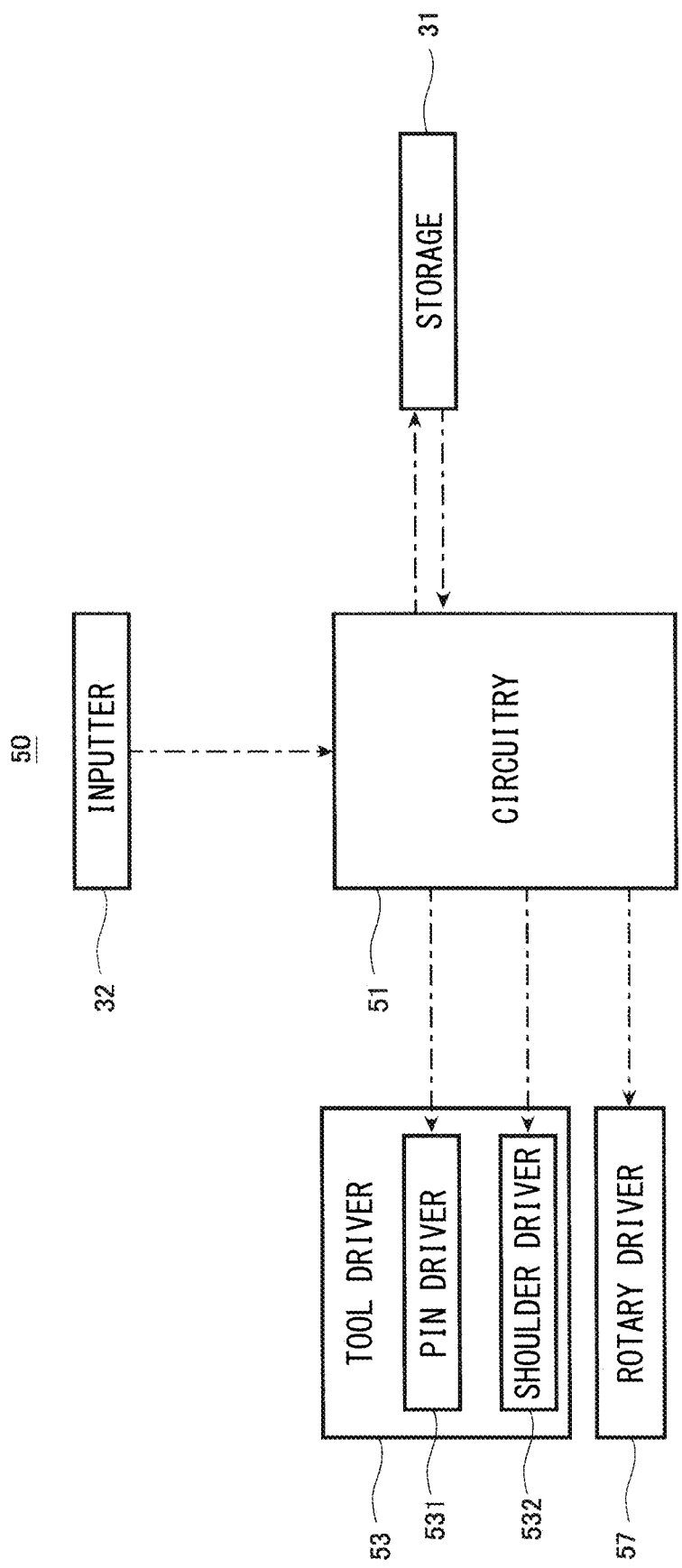
FIG. 2 is a block diagram schematically showing a control configuration of the friction stir spot welder shown in FIG. 1.

FIG. 2 is a block diagram schematically showing the control configuration of the friction stir spot welder shown in FIG. 1.

As shown in FIG. 2, the friction stir spot welder 50 includes circuitry 51, a storage 31, an inputter 32, and a position detector 33.

The circuitry 51 controls respective structures (respective devices) included in the friction stir spot welder 50. Specifically, the circuitry 51 reads and executes software, such as a basic program, stored in the storage to control the pin driver 531 and the shoulder driver 532 included in the tool driver 53 and the rotary driver 57.

With this, switching between advancing and retracting of the pin 11 and the shoulder 12, control of the positions of a tip of the pin 11 and a tip of the shoulder 12 during advancing or retracting, movement speeds of the pin 11 and the shoulder 12, movement directions of the pin 11 and the shoulder 12, and the like can be controlled. Moreover, pressing forces applied to the workpiece 60 from the pin 11, the shoulder 12, and the clamp structure 13 can be controlled. Furthermore, rotational frequencies of the pin 11 and the shoulder 12 can be controlled.

The circuitry 51 may include a single circuitry 51 which performs centralized control or may include circuitries 51 which cooperate to perform distributed control. Moreover, the circuitry 51 may include a microcomputer or may include an MPU, a PLC (Programmable Logic circuitry), a logic circuit, or the like.

Moreover, the circuitry 51 may control respective structures (respective devices) included in the friction stir spot welder 50 such that the contents (aspects) described in ISO18785 are included as the friction stir spot welding.

The storage 31 stores a basic program and various data such that the basic program and various data are readable. The storage 31 includes a known memory, a storage such as a hard disk, or the like. The storage 31 does not have to be a single storage and may include storages (for example, a random access memory and a hard disc drive). When the circuitry 51 and the like are included in a microcomputer, at least part of the storage 31 may be an internal memory of the microcomputer or may be an independent memory.

Needless to say, the storage 31 stores data, and the data may be read by a device other than the circuitry 51, and the circuitry 51 and the like may write data in the storage 31.

The inputter 32 inputs, to the circuitry 51, various parameters regarding the control of the friction stir spot welding, other data, and the like. The inputter 32 includes a known input device, such as a keyboard, a touch panel, or a button switch group. In Embodiment 1, at least data of welding conditions of the workpiece 60, such as the thickness, material, and the like of the workpiece 60, can be input by the inputter 32.

The position detector 33 detects positional information of the tip (tip surface 12a) of the shoulder 12 and outputs the detected positional information to the circuitry 51. A displacement sensor, a LVDT, an encoder, or the like may be used as the position detector 33.

Operation (Operating Method) of Friction Stir Spot Welder

Next, the operation of the friction stir spot welder 50 according to Embodiment 1 will be specifically described with reference to FIGS. 3, 4A, and 4B. FIGS. 4A and 4B shown an example in which the first workpiece 61 and the second workpiece 62 are used as the workpiece 60 and are laminated on each other and coupled to each other by spot welding.

Figure 3:
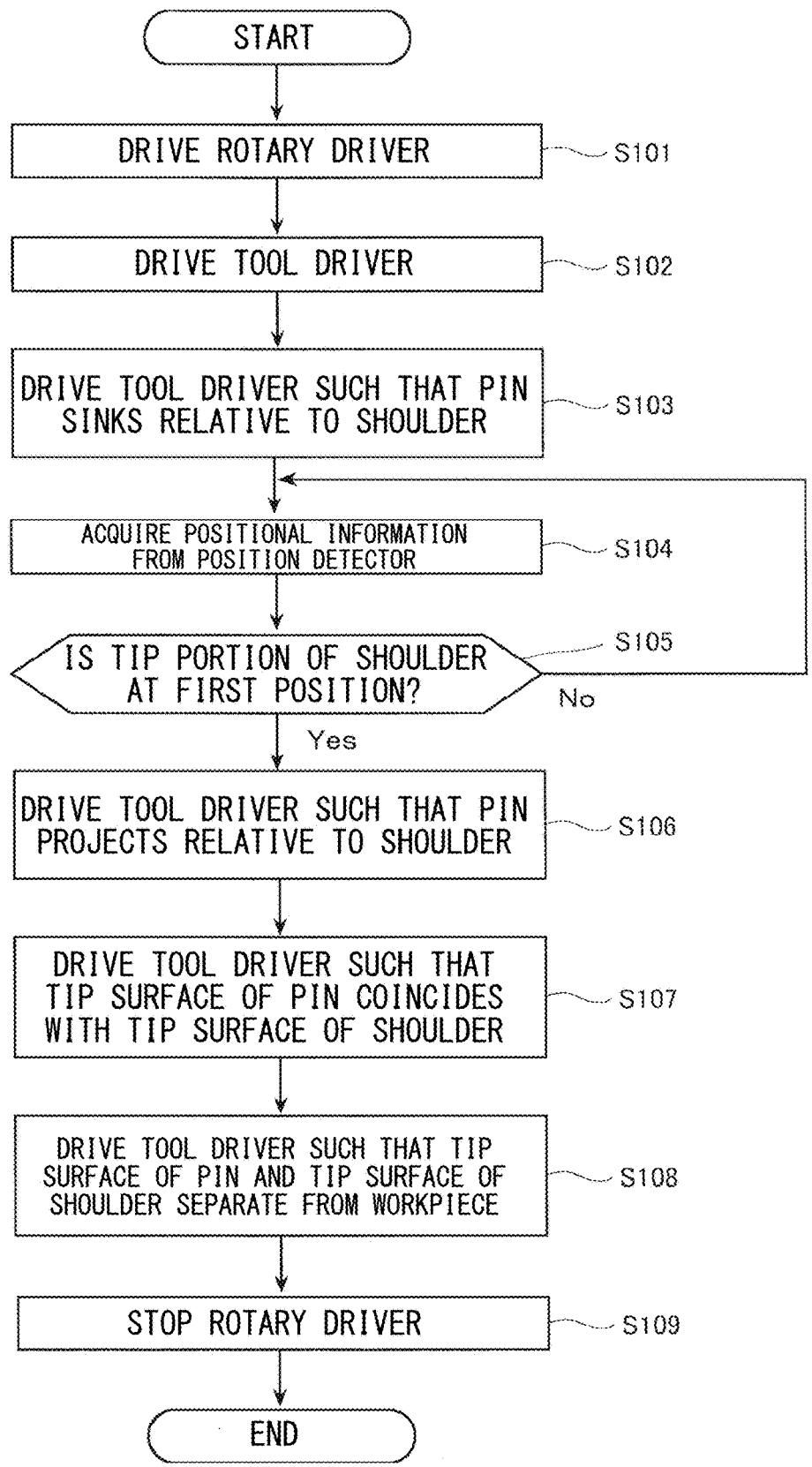
FIG. 3 is a flowchart showing one example of an operation of the friction stir spot welder according to Embodiment 1.
Figure 4A:
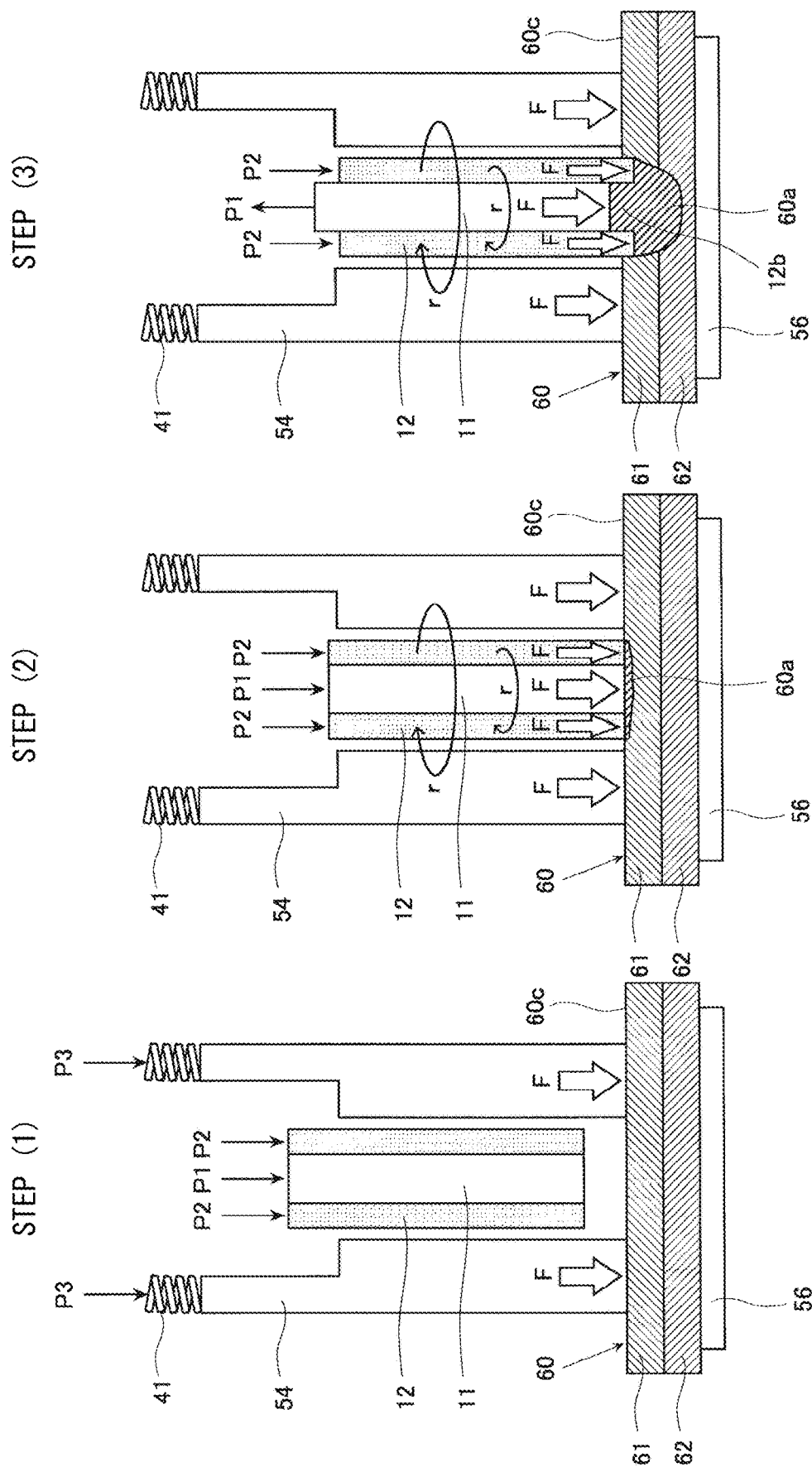
FIG. 4A is a process diagram schematically showing one example of steps of friction stir spot welding performed by the friction stir spot welder shown in FIG. 1.
Figure 4B:
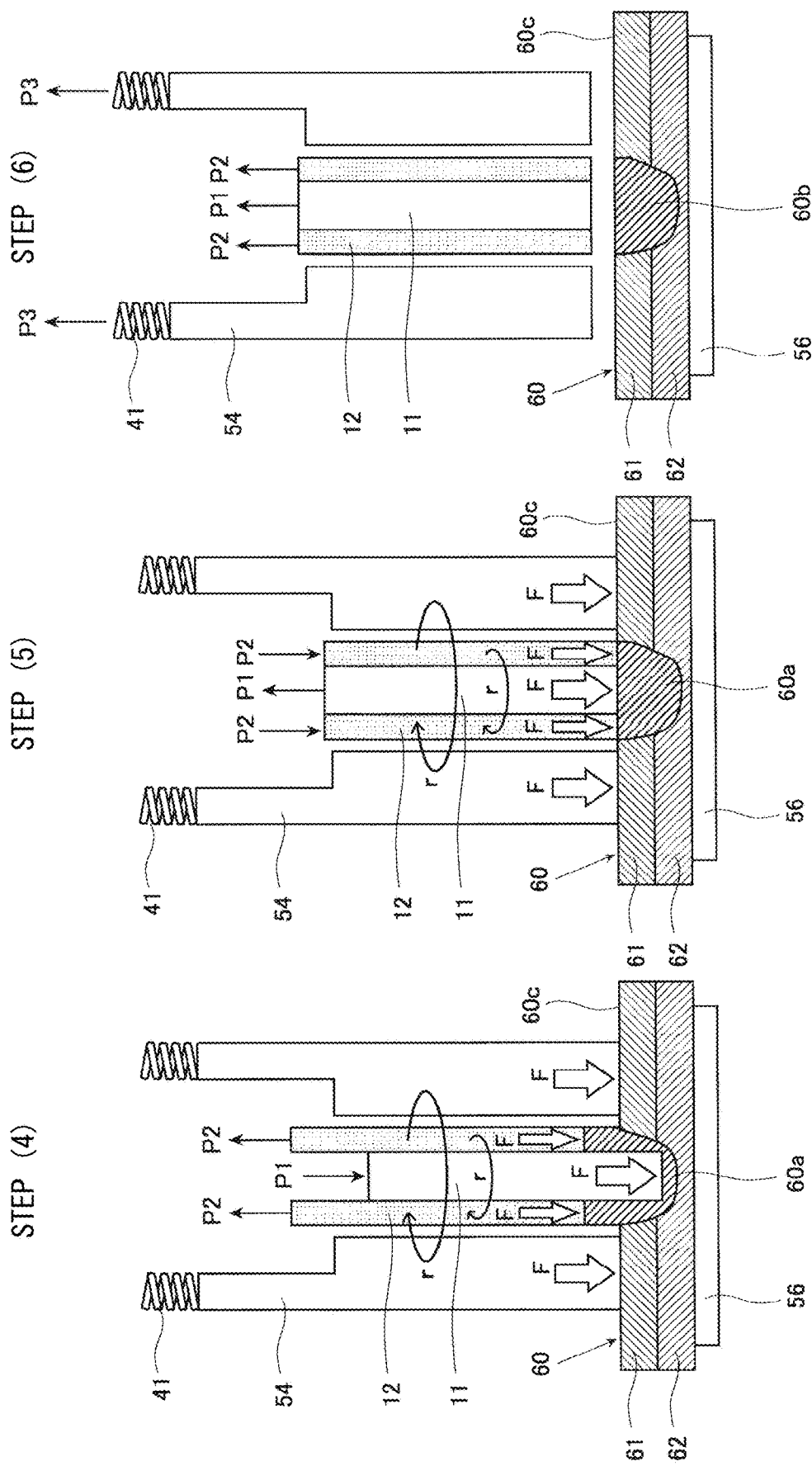
FIG. 4B is a process diagram schematically showing one example of steps of the friction stir spot welding performed by the friction stir spot welder shown in FIG. 1.

FIG. 3 is a flowchart showing one example of the operation of the friction stir spot welder according to Embodiment 1. Each of FIGS. 4A and 4B is a process diagram schematically showing one example of steps of the friction stir spot welding performed by the friction stir spot welder shown in FIG. 1.

In FIGS. 4A and 4B, part of the friction stir spot welder is not shown. Arrows r indicate the rotational directions of the pin 11 and the shoulder 12, and block arrows F indicate directions of forces applied to the first workpiece 61 and the second workpiece 62. Moreover, although forces are applied to the first workpiece 61 and the second workpiece 62 also from the backing structure 56, such forces are not shown in FIGS. 4A and 4B for convenience of explanation. Furthermore, the shoulder 12 is shown by cross hatching so as to be clearly distinguished from the pin 11 and the clamp structure 13.

First, a worker (operator) places the workpiece 60 on the supporting surface 56a of the backing structure 56. Next, the worker manipulates the inputter 32 to input execution of welding of the workpiece 60 to the circuitry 51. A robot may place the workpiece 60 on the supporting surface 56a of the backing structure 56.

Then, as shown in FIG. 3, the circuitry 51 drives the rotary driver 57 to rotate the pin 11 and the shoulder 12 at a preset and predetermined first rotational frequency (for example, 200 to 3,000 rpm) (Step S101; see Step (1) in FIG. 4A).

Next, while driving the tool driver 53 (shoulder driver 532) to rotate the pin 11 and the shoulder 12, the circuitry 51 makes the pin 11, the shoulder 12, and the clamp structure 13 approach the workpiece 60 and brings the tip surface 11a of the pin 11, the tip surface 12a of the shoulder 12, and the tip surface 13a of the clamp structure 13 (not shown in FIGS. 4A and 4B) into contact with a front surface 60c of the workpiece 60 (Step S102; see Step (2) in FIG. 4A).

At this time, the circuitry 51 controls the tool driver 53 (shoulder driver 532) such that the pin 11, the shoulder 12, and the clamp structure 13 press the workpiece 60 by a preset and predetermined first pressing force (for example, 3 to 15 kN).

With this, the first workpiece 61 and the second workpiece 62 are sandwiched by the clamp structure 134 and the backing structure 56, and the clamp structure 13 is biased toward the front surface 60c of the workpiece 60 by the contraction of the clamp driver 41 to generate clamping force.

Moreover, in this state, since the pin 11 and the shoulder 12 do not advance or retract, the front surface 60c of the workpiece 60 is subjected to "preheating." With this, a constituent material at a contact region of the first workpiece 61 is softened by heat generated by friction, and thus, a plastically flowing portion 60a is generated in the vicinity of the front surface 60c of the workpiece 60.

Next, the circuitry 51 drives the tool driver 53 such that the tip surface 11a of the pin 11 sinks relative to the tip surface 12a of the shoulder 12 (Step S103). At this time, the circuitry 51 may drive the tool driver 53 (pin driver 531) such that the pin 11 separates from the workpiece 60. Moreover, the circuitry 51 may drive the tool driver 53 (pin driver 531) such that the shoulder 12 is pressed in the workpiece 60.

Next, the circuitry 51 acquires the positional information of the tip portion of the shoulder 12 from the position detector 33 (Step S104). Then, the circuitry 51 determines whether or not the positional information of the tip portion of the shoulder 12 acquired in Step S104 has reached a preset and predetermined first position (Step S105).

The first position may be set in advance by experiments or the like. When a front surface of the first workpiece 61 (the front surface 60c of the workpiece 60) is regarded as 0%, and a surface of the second workpiece 62 which contacts the supporting surface 56a is regarded as 100%, the first position is set arbitrarily within a range of more than 0% and not more than 100%.

In order to suppress the decrease in the press-in speed, the first position may be 46.0% or more, 54.0% or more, or 57.5% or more. Moreover, in order to suppress the breakage of the shoulder 12, the first position may be 100.0% or less, 85.0% or less, or 80.0% or less.

With this, a softened portion of the workpiece 60 extends from the first workpiece 61 at the upper side to the second workpiece 62 at the lower side, and the volume of the plastically flowing portion 60a increases. Moreover, a softened material of the plastically flowing portion 60a is pushed away by the shoulder 12 to flow from a position right under the shoulder 12 to a position right under the pin 11. Therefore, the pin 11 retracts and moves upward relative to the shoulder 12 (see Step (3) in FIG. 4A).

When the circuitry 51 determines that the positional information of the tip portion of the shoulder 12 acquired in Step S104 has not yet reached the first position (No in Step S105), the circuitry 51 returns to Step S104. The circuitry 51 repeatedly performs Steps S104 and S105 until the circuitry 51 determines that the positional information of the tip portion of the shoulder 12 acquired in Step S104 has reached the first position.

In contrast, when the circuitry 51 determines that the positional information of the tip portion of the shoulder 12 acquired in Step S104 has reached the first position (Yes in Step S105), the circuitry 51 performs Step S106.

In Step S106, the circuitry 51 drives the tool driver 53 (pin driver 531) such that the pin 11 advances toward the workpiece 60, or the circuitry 51 drives the tool driver 53 (shoulder driver 532) such that the shoulder 12 separates from the workpiece 60.

With this, the pin 11 gradually advances toward the first workpiece 61, and the shoulder 12 retracts from the first workpiece 61 (see Step (4) in FIG. 4B). At this time, the softened portion of the plastically flowing portion 60a flows from the position right under the pin 11 to the position right under the shoulder 12 (to a recess generated by press-in of the shoulder 12).

The circuitry 51 may control the tool driver 53 such that the tip surface 11a of the pin 11 is located at the first position. Moreover, the circuitry 51 may control the tool driver 53 such that the tip surface 11a of the pin 11 reaches an inside of the second workpiece 62 or may control the tool driver 53 such that the tip surface 11a of the pin 11 is located inside the first workpiece 61.

Moreover, it is preferable that the circuitry 51 control the tool driver 53 in Step S103 and/or Step S106 so as to reduce an absolute value of a tool average position Tx defined by Formula (I) below.

$$Ap \cdot Pp + As \cdot Ps = Tx \qquad (I)$$

In Formula (I), Ap denotes an area of the tip surface 11a of the pin 11, As denotes an area of the tip surface 12a of the shoulder 12, Pp denotes a press-in depth of the pin 11, and Ps denotes a press-in depth of the shoulder 12. It is more preferable that the circuitry 51 control the tool driver 53 such that the tool average position Tx becomes zero. Since specific control of reducing the absolute value of the tool average position Tx is disclosed in PTL 1 in detail, an explanation thereof is omitted herein.

Next, the circuitry 51 controls the tool driver 53 such that almost no level difference is generated between the tip surface 11a of the pin 11 and the tip surface 12a of the shoulder 12 (the tip surface 11a of the pin 11 and the tip surface 12a of the shoulder 12 are flush with each other) (Step S107; see Step (5) in FIG. 4B). With this, the front surface 60c of the workpiece 60 is shaped, and a substantially flat surface where recesses are not practically generated is obtained.

Next, the circuitry 51 drives the tool driver 53 such that the pin 11, the shoulder 12, and the clamp structure 13 separate from the workpiece 60 (Step S108). Then, the circuitry 51 controls the rotary driver 57 to stop the rotation of the pin 11 and the shoulder 12 (Step S109; see Step (6) in FIG. 4B) and terminates the friction stir spot welding (step of welding the workpiece 60).

With this, since the rotation (and pressing) of the pin 11 and the shoulder 12 during the contact of the pin 11 and the shoulder 12 with the first workpiece 61 and the second workpiece 62 is not applied to the first workpiece 61 and the second workpiece 62, the plastic flow stops at the plastically flowing portion 60a spreading in both the first workpiece 61 and the second workpiece 62, and the plastically flowing portion 60a becomes a welded portion 60b.

The friction stir spot welder 50 according to Embodiment 1 configured as above is configured such that when the first position as a target position for the shoulder 12 that is pressed in the workpiece 60 is a position of 46% or more of the thickness of the workpiece 60 from the front surface 60c of the workpiece 60, the press-in speed of the shoulder 12 until the shoulder 12 reaches the first position is a constant speed.

Specifically, the surface pressure of the tip surface 12a of the shoulder 12 is increased by reducing the area of the tip surface 12a of the shoulder 12. More specifically, the area of the tip surface 12a of the shoulder 12 is set to be smaller than 43.98 mm$^2$. In Embodiment 1, the area of the tip surface 12a is 39.86 mm$^2$ or less and 35.34 mm$^2$ or more.

With this, as in Test Examples described below, when the rotational speed of the shoulder 12 is the same, the smaller the area of the tip surface 12a is, the higher the press-in speed of the shoulder 12 with respect to the workpiece 60 can be set.

Moreover, decreasing the area of the tip surface 12a of the shoulder 12 means increasing the area of the tip surface 11a of the pin 11 (i.e., increasing the diameter of the tip surface 11a). With this, the volume of an internal space 12b (see Step (3) in FIG. 4A) of the shoulder 12 can be increased.

Therefore, even when the press-in depth of the shoulder 12 is large, the softened material of the plastically flowing portion 60a easily gets into the internal space 12b of the shoulder 12, and the decrease in the press-in speed of the shoulder 12 with respect to the workpiece 60 can be suppressed (the press-in speed can be made constant).

Therefore, even when the friction stir spot welder 50 according to Embodiment 1 welds the workpiece 60 that is thick, the press-in speed of the shoulder 12 can be made constant, and the welding time can be prevented from increasing.

TEST EXAMPLE

Next, welding tests of the workpiece 60 by the friction stir spot welder 50 according to Embodiment 1 will be described.

Example 1

As Example 1, the welding test of the workpiece 60 was executed by using the friction stir spot welder 50 in which: the area of the tip surface 12a of the shoulder 12 was 39.86 mm$^2$; and the area of the tip surface 11a of the pin 11 was 23.76 mm$^2$.

Example 2

As Example 2, the welding test of the workpiece 60 was executed by using the friction stir spot welder 50 in which: the area of the tip surface 12a of the shoulder 12 was 35.34 mm$^2$; and the area of the tip surface 11a of the pin 11 was 28.27 mm$^2$.

Comparative Example

As Comparative Example, the welding test of the workpiece 60 was executed by using the friction stir spot welder 50 in which: the area of the tip surface 12a of the shoulder 12 was 43.98 mm$^2$; and the area of the tip surface 11a of the pin 11 was 19.63 mm$^2$.

Test Example 1

Used as the first workpiece 61 was an aluminum plate (A5052-O) having a length of 40 mm, a width of 125 mm, and a thickness of 2 mm. Used as the second workpiece 62 was an aluminum plate (A5052-O) having a length of 40 mm, a width of 125 mm, and a thickness of 2 mm. Moreover, a first rotational frequency that is the rotational frequency of the pin 11 and the shoulder 12 was 1,600 rpm, and a first pressing force that is a pressing force of the pin 11 and the shoulder 12 was 14,000 N.

Used as the clamp driver 41 was a spring. A load of 5,000 N acted upward by a reaction of an elastic force of the spring. Therefore, a load of 9,000 N acted on the workpiece 60. In the friction stir spot welder 50 according to Example 1, a load of 225.80 MPa acted on the tip surface 12a of the shoulder 12. Similarly, in the friction stir spot welder 50 according to Example 2, a load of 254.65 MPa acted on the tip surface 12a of the shoulder 12.

Test Result 1

The first position as a target reaching position of the shoulder 12 was set to a position located downward from the front surface 60c of the workpiece 60 by 1.5 mm, 1.9 mm, 2.3 mm, 2.7 mm, or 3.4 mm, and the welding test of the workpiece 60 was executed under the conditions of Test Example 1 by using the friction stir spot welder 50 according to Example 1. Then, the position of the tip surface 12a of the shoulder 12 was plotted.

Similarly, the first position as the target reaching position of the shoulder 12 was set to a position located downward from the front surface 60c of the workpiece 60 by 1.5 mm, 1.9 mm, 2.3 mm, 2.7 mm, 3.4 mm, or 4.0 mm, and the welding test of the workpiece 60 was executed under the conditions of Test Example 1 by using the friction stir spot welder 50 according to Example 2. Then, the position of the tip surface 12a of the shoulder 12 in each welding test was plotted.

Moreover, the first position as the target reaching position of the shoulder 12 was set to a position located downward from the front surface 60c of the workpiece 60 by 1.5 mm, 1.9 mm, 2.3 mm, or 2.7 mm, and the welding test of the workpiece 60 was executed under the conditions of Test Example 1 by using the friction stir spot welder 50 according to Comparative Example. Then, the position of the tip surface 12a of the shoulder 12 in each welding test was plotted.

Figure 5:
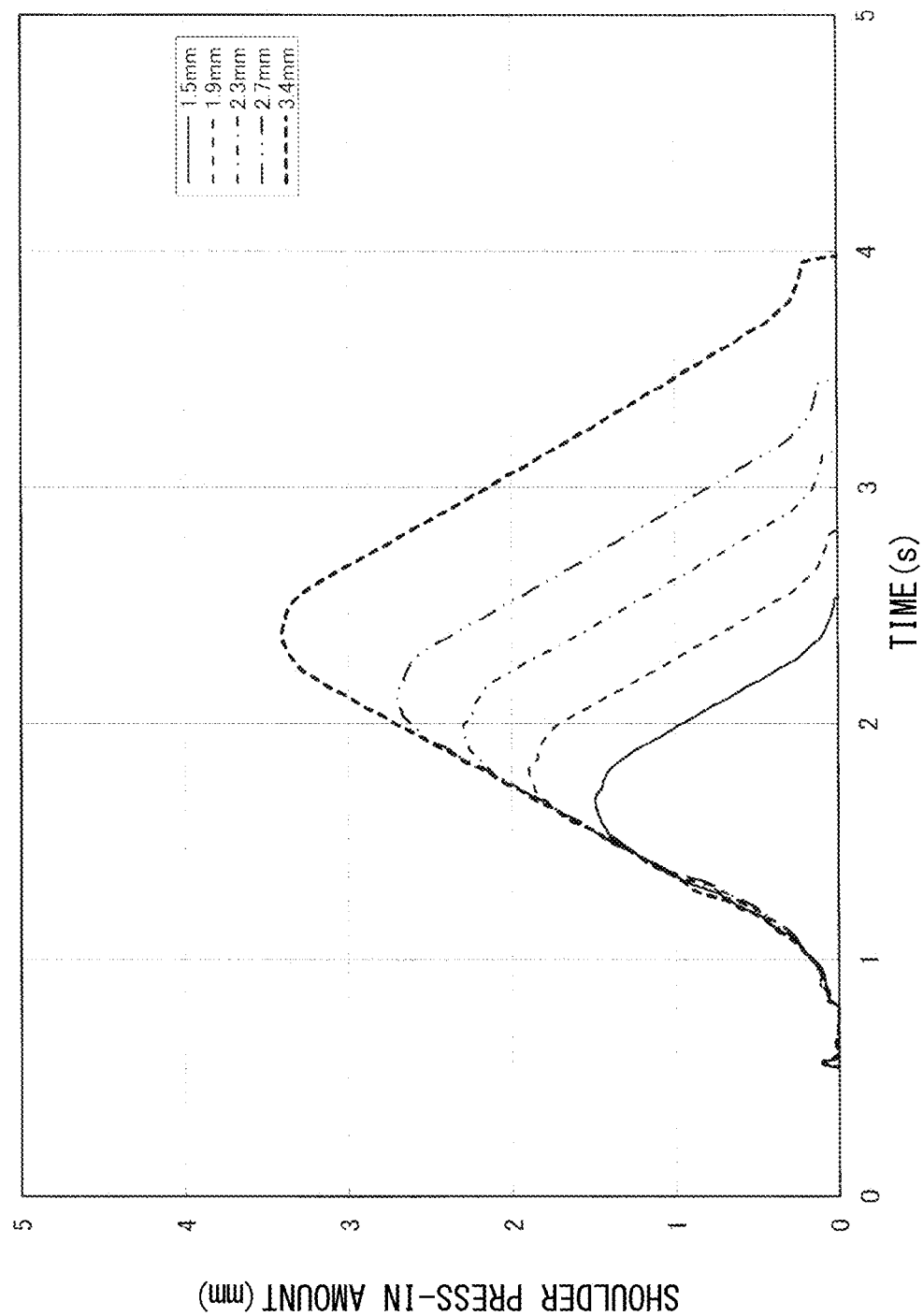
FIG. 5 shows results obtained by plotting a position of a tip surface of a shoulder when a welding test of a workpiece was executed under conditions of Test Example 1 by using the friction stir spot welder according to Example 1.
Figure 6:
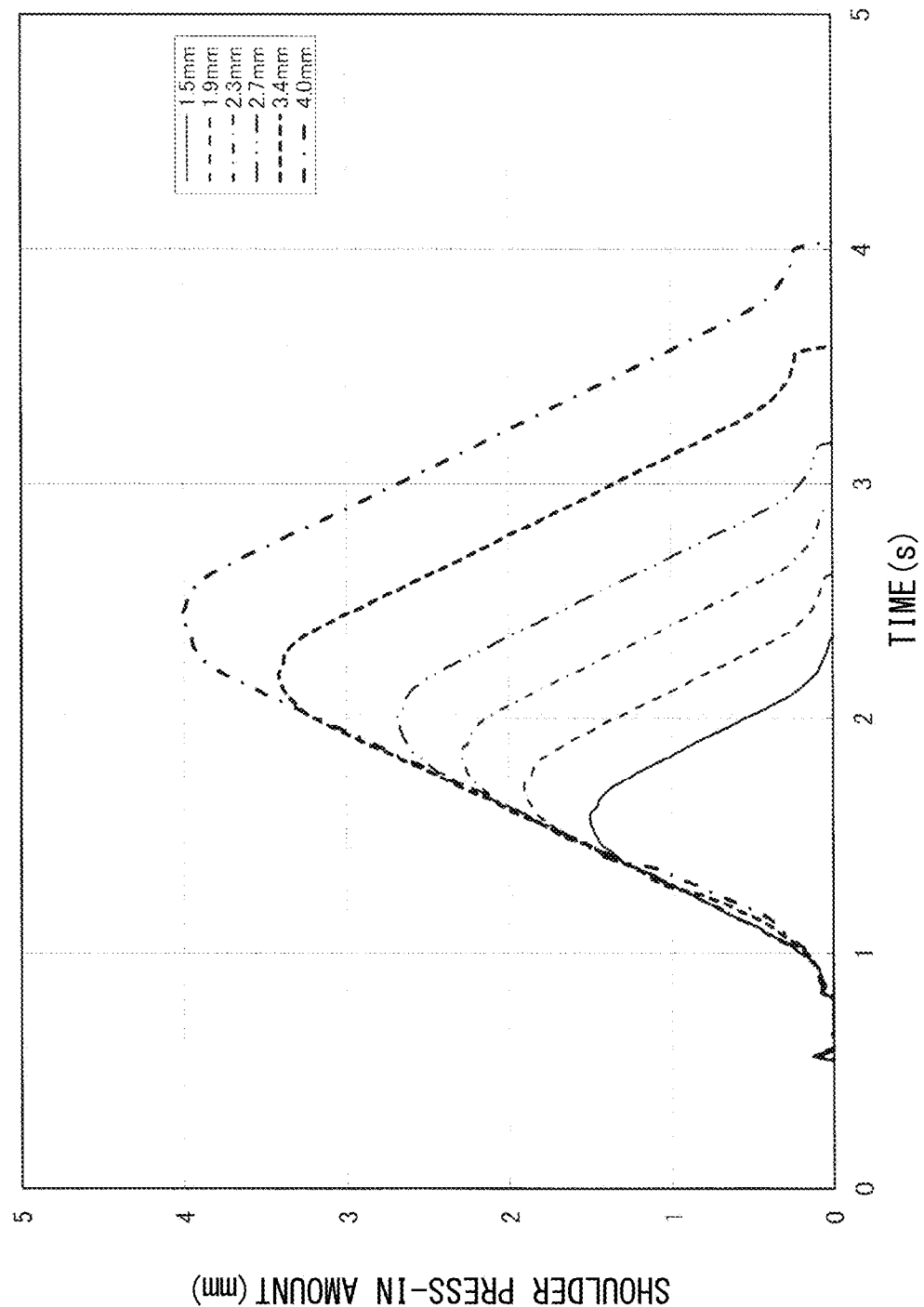
FIG. 6 shows results obtained by plotting the position of the tip surface of the shoulder when the welding test of the workpiece was executed under the conditions of Test Example 1 by using the friction stir spot welder according to Example 2.
Figure 7:
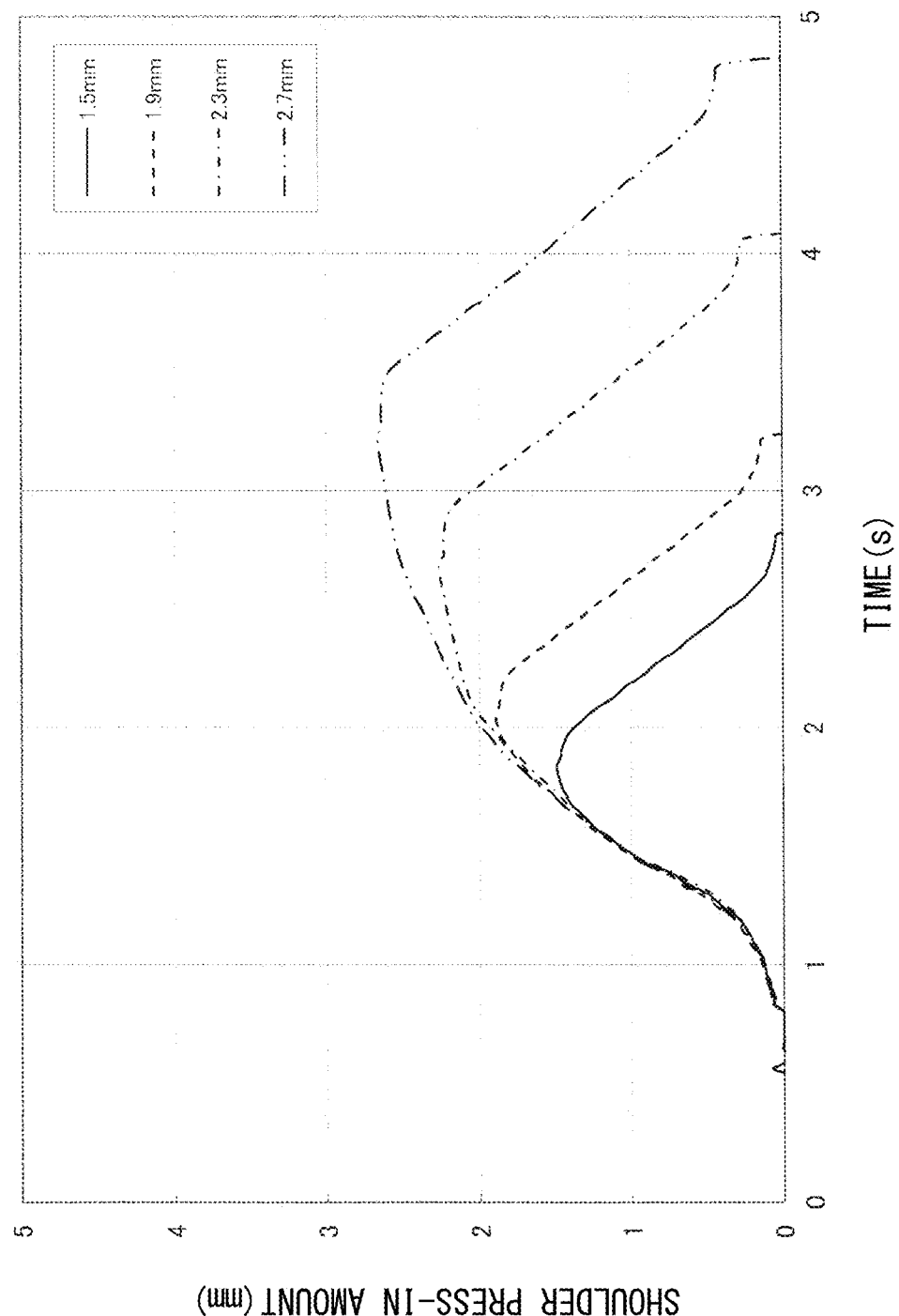
FIG. 7 shows results obtained by plotting the position of the tip surface of the shoulder when the welding test of the workpiece was executed under the conditions of Test Example 1 by using the friction stir spot welder according to Comparative Example.

FIG. 5 shows results obtained by plotting the position of the tip surface of the shoulder when the welding test of the workpiece was executed under the conditions of Test Example 1 by using the friction stir spot welder according to Example 1. FIG. 6 shows results obtained by plotting the position of the tip surface of the shoulder when the welding test of the workpiece was executed under the conditions of Test Example 1 by using the friction stir spot welder according to Example 2. FIG. 7 shows results obtained by plotting the position of the tip surface of the shoulder when the welding test of the workpiece was executed under the conditions of Test Example 1 by using the friction stir spot welder according to Comparative Example.

Figure 8:
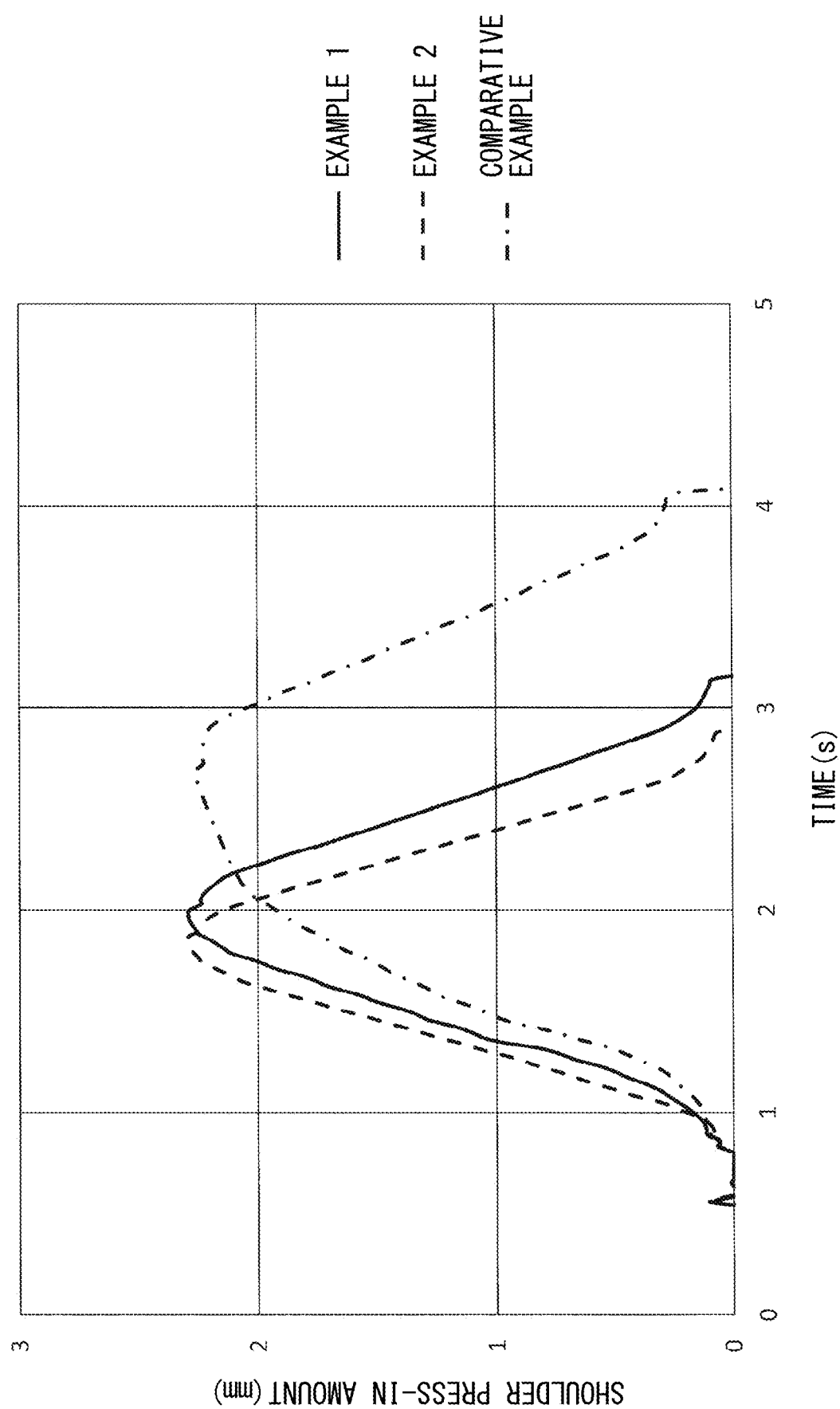
FIG. 8 shows results obtained by plotting the position of the tip surface of the shoulder when the welding test of the workpiece was executed under the conditions of Test Example 1 by using the friction stir spot welders according to Example 1, Example 2, and Comparative Example.

Moreover, FIG. 8 shows results obtained by plotting the position of the tip surface of the shoulder when the welding test of the workpiece was executed under the conditions of Test Example 1 by using the friction stir spot welders according to Example 1, Example 2, and Comparative Example. FIG. 8 shows the results obtained when the first position was set to 2.3 mm.

Figures 15A, 15B, 15C:
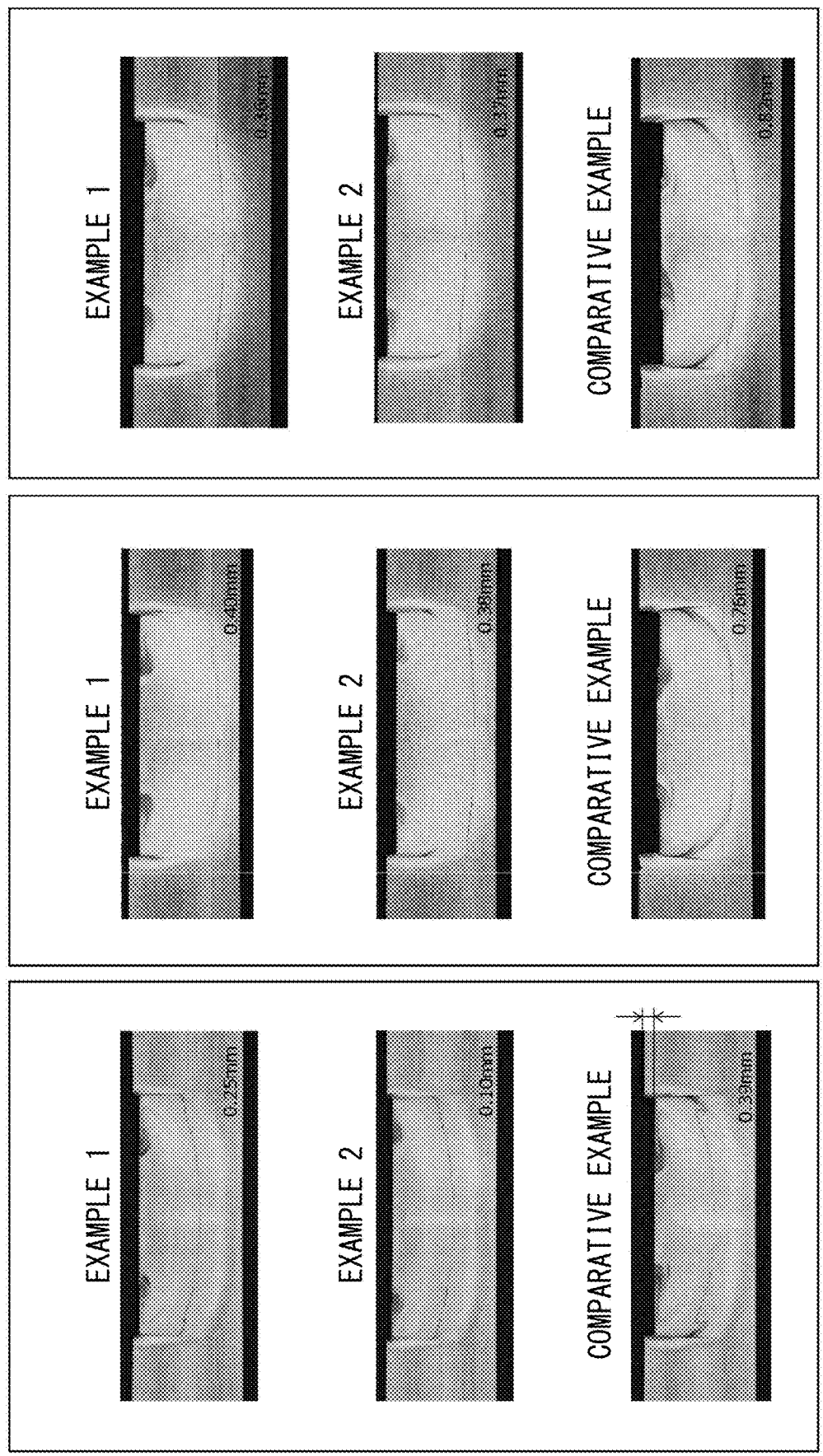
FIG. 15 shows photographs of sections of the workpieces subjected to the friction stir spot welding by using the friction stir spot welders according to Example 1, Example 2, and Comparative Example.

Furthermore, FIG. 15A shows photographs of sections of the workpieces subjected to the friction stir spot welding under the conditions of Test Example 1 by using the friction stir spot welders according to Example 1, Example 2, and Comparative Example when the first position was set to 2.7 mm.

First, as shown in FIG. 8, the press-in speed of the shoulder 12 with respect to the workpiece 60 in each of the friction stir spot welders 50 of Examples 1 and 2 in which the area of the tip surface 12a of the shoulder 12 is smaller than that of Comparative Example can be made higher than that in the friction stir spot welder 50 of Comparative Example.

Moreover, as shown in FIG. 7, when the press-in depth of the shoulder 12 is large, it takes time for the shoulder 12 to reach the first position in the friction stir spot welder 50 of Comparative Example. In other words, in the friction stir spot welder 50 of Comparative Example, the press-in speed of the shoulder 12 until the shoulder 12 reaches the first position cannot be made constant (the press-in speed decreases). Therefore, the welding time of the workpiece 60 is long.

On the other hand, as shown in FIGS. 5 and 6, even when the press-in depth of the shoulder 12 is large, the press-in speed of the shoulder 12 until the shoulder 12 reaches the first position can be maintained constant in the friction stir spot welders 50 of Examples 1 and 2. Therefore, the welding time can be prevented from increasing in the friction stir spot welders 50 of Examples 1 and 2 as compared to the friction stir spot welder 50 of Comparative Example.

Furthermore, as shown in FIG. 15A, according to the friction stir spot welder 50 of Comparative Example, a recess amount (a distance between the front surface 60c and a bottom surface of a recess; indent amount) of the welded portion of the welded workpiece 60 from the front surface 60c was 0.39 mm.

On the other hand, according to the friction stir spot welder 50 of Example 1, the indent amount of the welded workpiece 60 was 0.25 mm. According to the friction stir spot welder 50 of Example 2, the indent amount of the welded workpiece 60 was 0.25 mm.

Regarding these results, the present inventors infer that: according to the friction stir spot welder 50 of Comparative Example, since it takes time for the tip surface 12a of the shoulder 12 to reach the first position, a plastically flowing material easily flows to between the first workpiece 61 and the second workpiece 62; and therefore, the indent amount of the workpiece 60 in Comparative Example is larger than that of the workpiece 60 welded by the friction stir spot welders 50 of Examples 1 and 2.

Test Example 2

Used as the first workpiece 61 was an aluminum plate (A5052-O) having a length of 40 mm, a width of 125 mm, and a thickness of 2 mm. Used as the second workpiece 62 was an aluminum plate (A5052-O) having a length of 40 mm, a width of 125 mm, and a thickness of 2 mm. Moreover, the first rotational frequency that is the rotational frequency of the pin 11 and the shoulder 12 was 1,600 rpm, and the first pressing force that is the pressing force of the pin 11 and the shoulder 12 was 13,000 N.

Used as the clamp driver 41 was a spring. A load of 5,000 N acted upward by a reaction of an elastic force of the spring. Therefore, a load of 8,000 N acted on the workpiece 60. In the friction stir spot welder 50 according to Example 1, a load of 200.71 MPa acted on the tip surface 12a of the shoulder 12. Similarly, in the friction stir spot welder 50 according to Example 2, a load of 226.35 MPa acted on the tip surface 12a of the shoulder 12.

Test Result 2

The first position as the target reaching position of the shoulder 12 was set to a position located downward from the front surface 60c of the workpiece 60 by 2.7 mm or 3.4 mm, and the welding test of the workpiece 60 was executed under the conditions of Test Example 2 by using the friction stir spot welder 50 according to Example 1. Then, the position of the tip surface 12a of the shoulder 12 was plotted.

Similarly, the first position as the target reaching position of the shoulder 12 was set to a position located downward from the front surface 60c of the workpiece 60 by 2.7 mm, 3.4 mm, or 4.0 mm, and the welding test of the workpiece 60 was executed under the conditions of Test Example 2 by using the friction stir spot welder 50 according to Example 2. Then, the position of the tip surface 12a of the shoulder 12 in each welding test was plotted.

Figure 9:
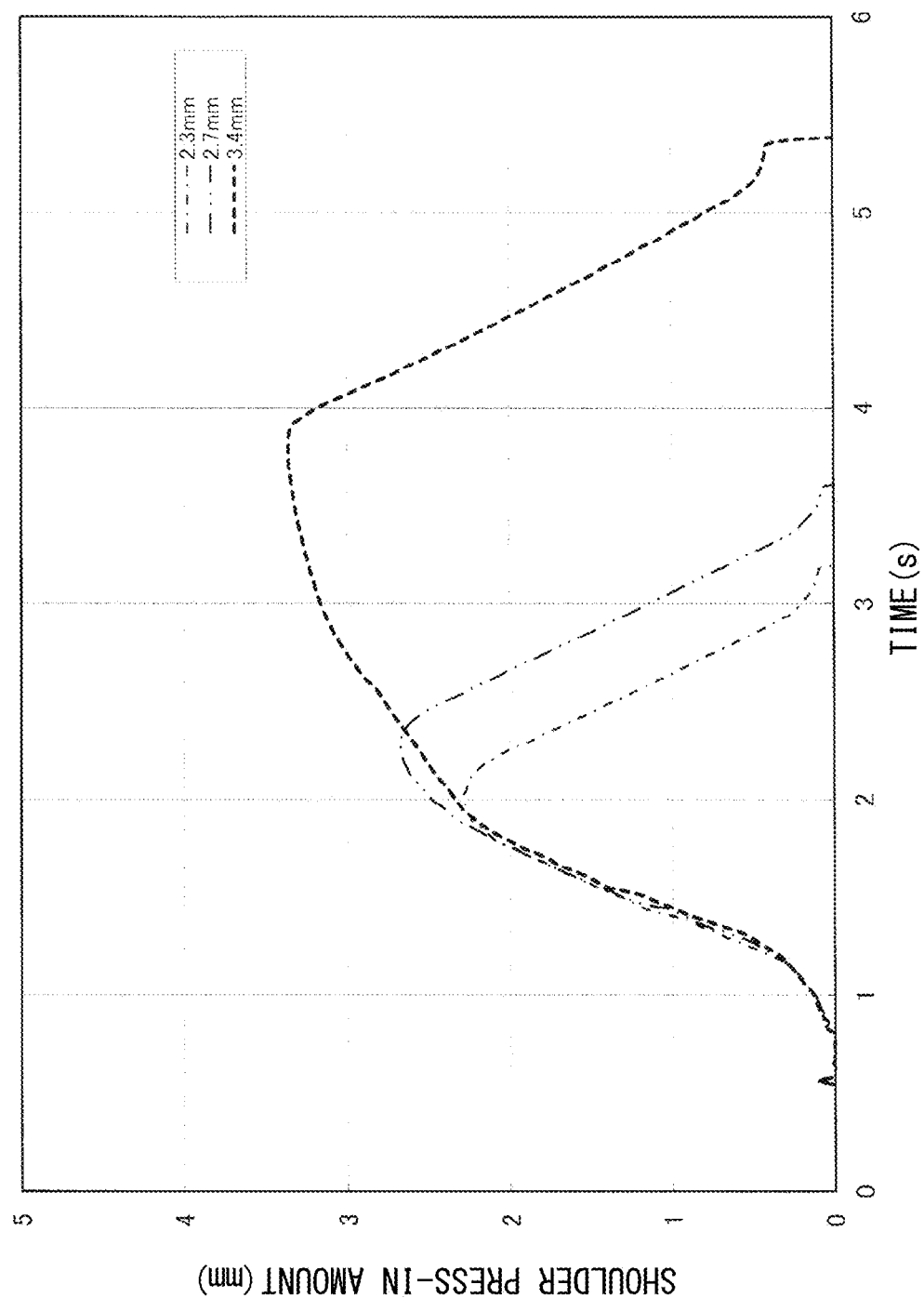
FIG. 9 shows results obtained by plotting the position of the tip surface of the shoulder when the welding test of the workpiece was executed under the conditions of Test Example 2 by using the friction stir spot welder according to Example 1.
Figure 10:
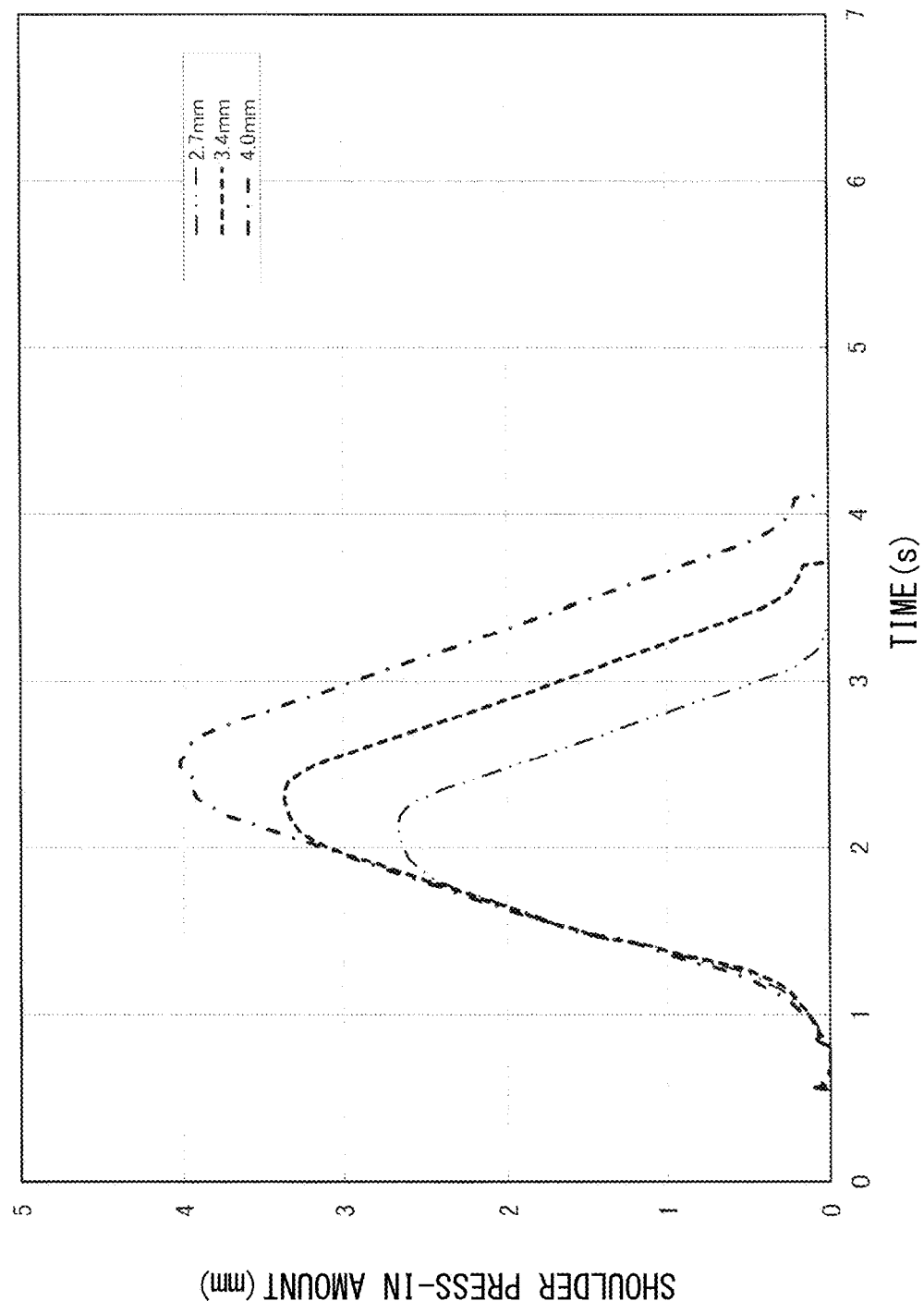
FIG. 10 shows results obtained by plotting the position of the tip surface of the shoulder when the welding test of the workpiece was executed under the conditions of Test Example 2 by using the friction stir spot welder according to Example 2.

FIG. 9 shows results obtained by plotting the position of the tip surface of the shoulder when the welding test of the workpiece was executed under the conditions of Test Example 2 by using the friction stir spot welder according to Example 1. FIG. 10 shows results obtained by plotting the position of the tip surface of the shoulder when the welding test of the workpiece was executed under the conditions of Test Example 2 by using the friction stir spot welder according to Example 2.

As shown in FIG. 9, in the friction stir spot welder 50 according to Example 1, when the first position is set to 2.3 mm, the press-in speed of the shoulder 12 until the shoulder 12 reaches the first position can be maintained constant. Moreover, as shown in FIG. 10, in the friction stir spot welder 50 according to Example 2, even when the first position is set to 4.0 mm, the press-in speed of the shoulder 12 until the shoulder 12 reaches the first position can be maintained constant.

The above shows that when the shoulder 12 is configured such that the surface pressure of the tip surface 12a of the shoulder 12 becomes 200.71 to 254.65 MPa, the press-in speed of the shoulder 12 until the shoulder 12 reaches the first position can be maintained constant in the friction stir spot welder 50.

Test Example 3

Used as the first workpiece 61 was an aluminum plate (A5052-O) having a length of 50 mm, a width of 150 mm, and a thickness of 3 mm. Used as the second workpiece 62 was an aluminum plate (A5052-O) having a length of 30 mm, a width of 100 mm, and a thickness of 1 mm.

Test Example 4

Used as the first workpiece 61 was an aluminum plate (A5052-O) having a length of 50 mm, a width of 150 mm, and a thickness of 3 mm. Used as the second workpiece 62 was an aluminum plate (A5052-O) having a length of 40 mm, a width of 125 mm, and a thickness of 2 mm.

Except for the conditions regarding the workpiece 60, the conditions in each of Test Examples 3 and 4 are the same as those in Test Example 1.

Test Result 3

The first position as the target reaching position of the shoulder 12 was set to a position located downward from the front surface 60c of the workpiece 60 by 1.5 mm, 1.9 mm, 2.3 mm, 2.7 mm, or 3.4 mm, and the welding test of the workpiece 60 was executed under the conditions of Test Examples 3 and 4 by using the friction stir spot welder 50 according to Example 1. Then, the position of the tip surface 12a of the shoulder 12 was plotted.

Similarly, the first position as the target reaching position of the shoulder 12 was set to a position located downward from the front surface 60c of the workpiece 60 by 1.5 mm, 1.9 mm, 2.3 mm, 2.7 mm, 3.4 mm, or 4.0 mm, and the welding test of the workpiece 60 was executed under the conditions of Test Examples 3 and 4 by using the friction stir spot welder 50 according to Example 2. Then, the position of the tip surface 12a of the shoulder 12 in each welding test was plotted.

Figure 11:
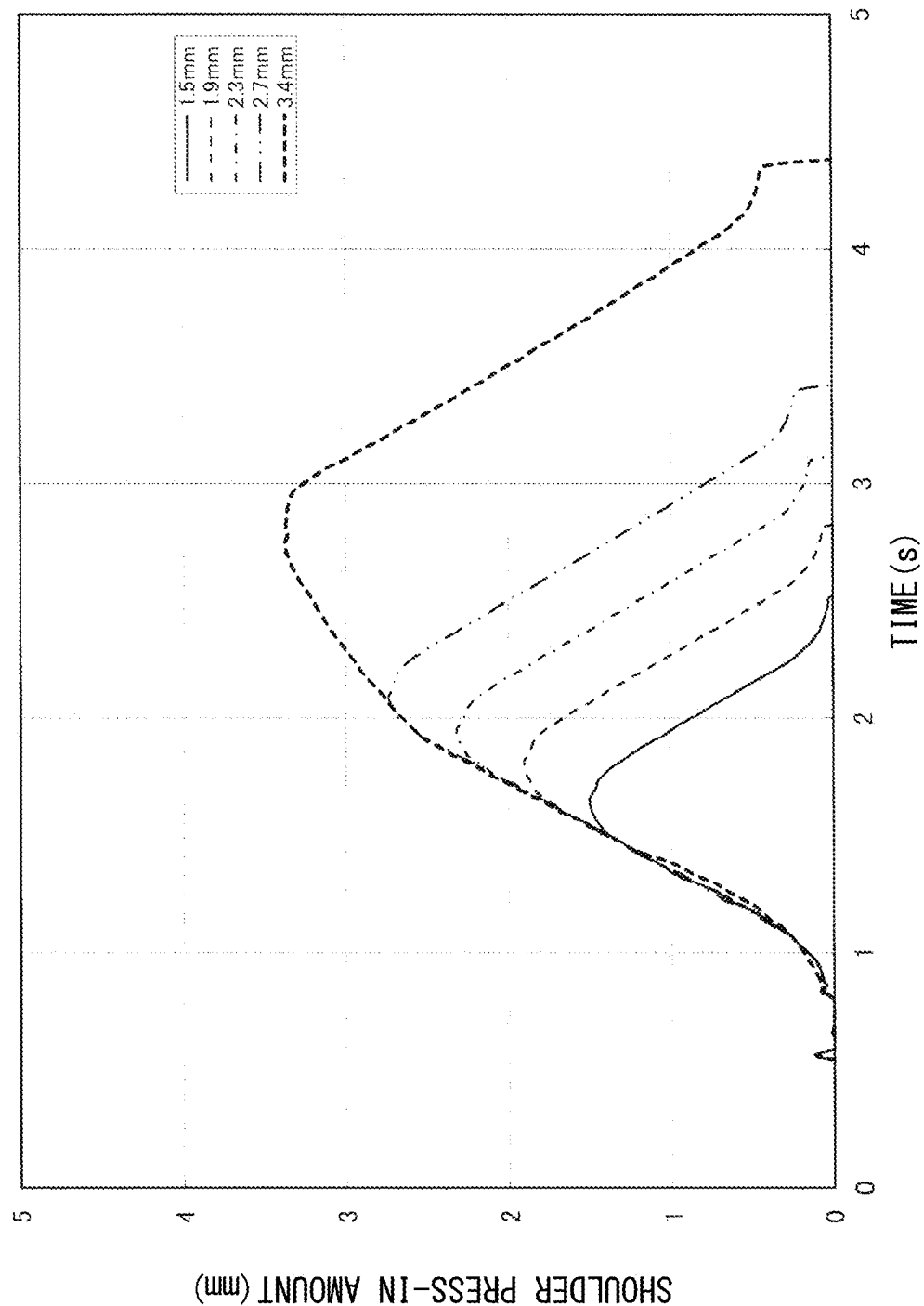
FIG. 11 shows results obtained by plotting the position of the tip surface of the shoulder when the welding test of the workpiece was executed under the conditions of Test Example 3 by using the friction stir spot welder according to Example 1.
Figure 12:
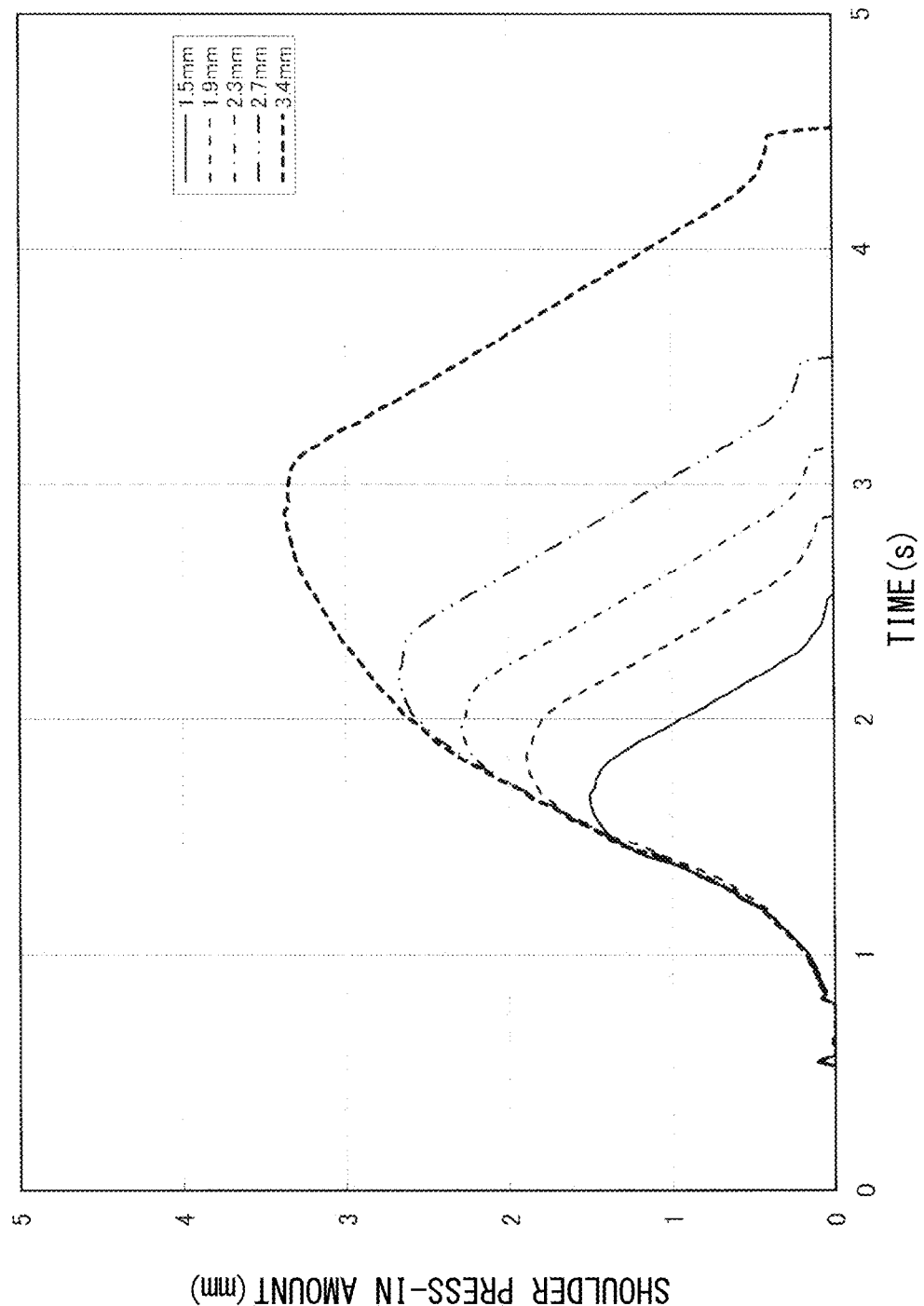
FIG. 12 shows results obtained by plotting the position of the tip surface of the shoulder when the welding test of the workpiece was executed under the conditions of Test Example 4 by using the friction stir spot welder according to Example 1.

FIG. 11 shows results obtained by plotting the position of the tip surface of the shoulder when the welding test of the workpiece was executed under the conditions of Test Example 3 by using the friction stir spot welder according to Example 1. FIG. 12 shows results obtained by plotting the position of the tip surface of the shoulder when the welding test of the workpiece was executed under the conditions of Test Example 4 by using the friction stir spot welder according to Example 1.

Figure 13:
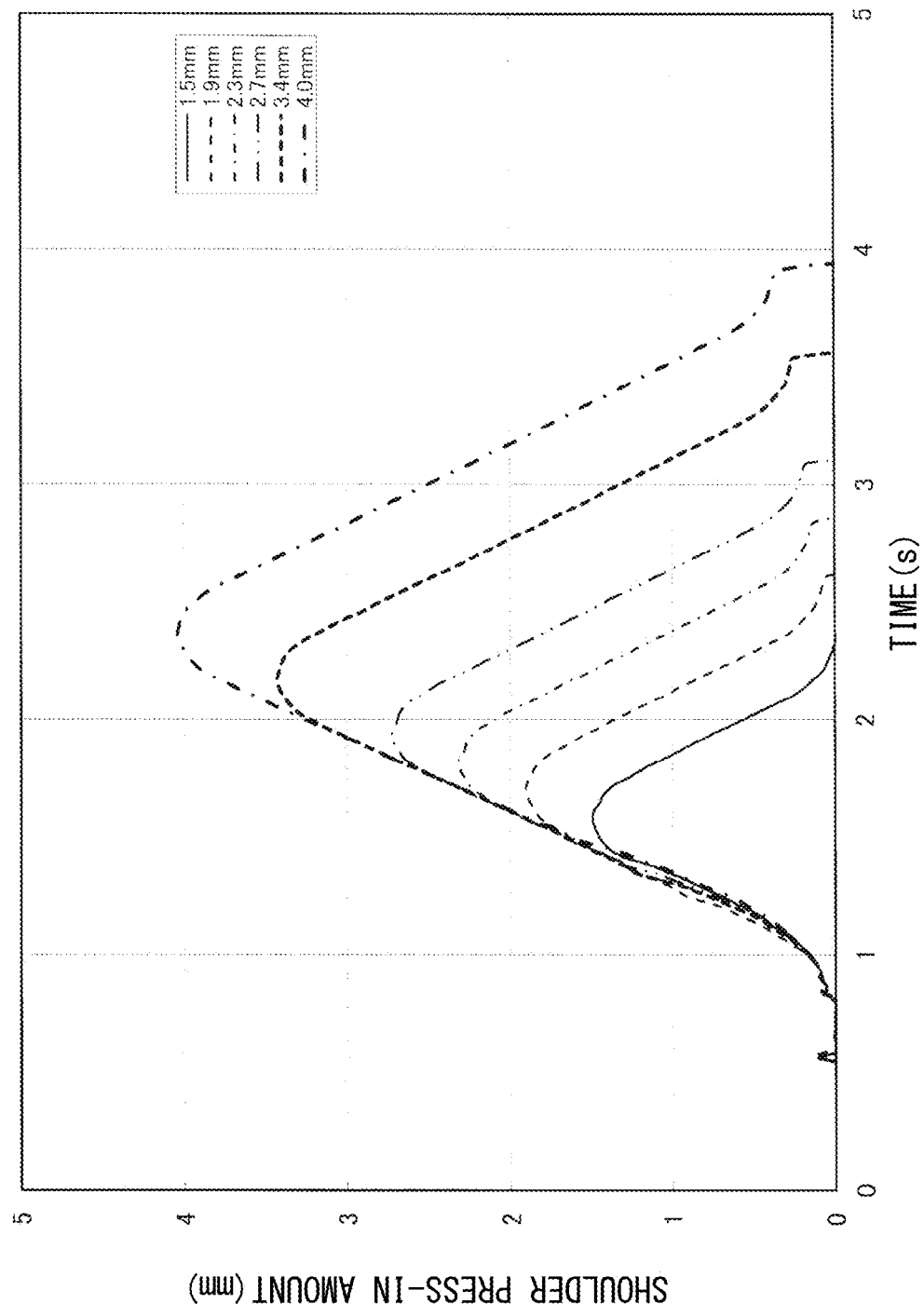
FIG. 13 shows results obtained by plotting the position of the tip surface of the shoulder when the welding test of the workpiece was executed under the conditions of Test Example 3 by using the friction stir spot welder according to Example 2.
Figure 14:
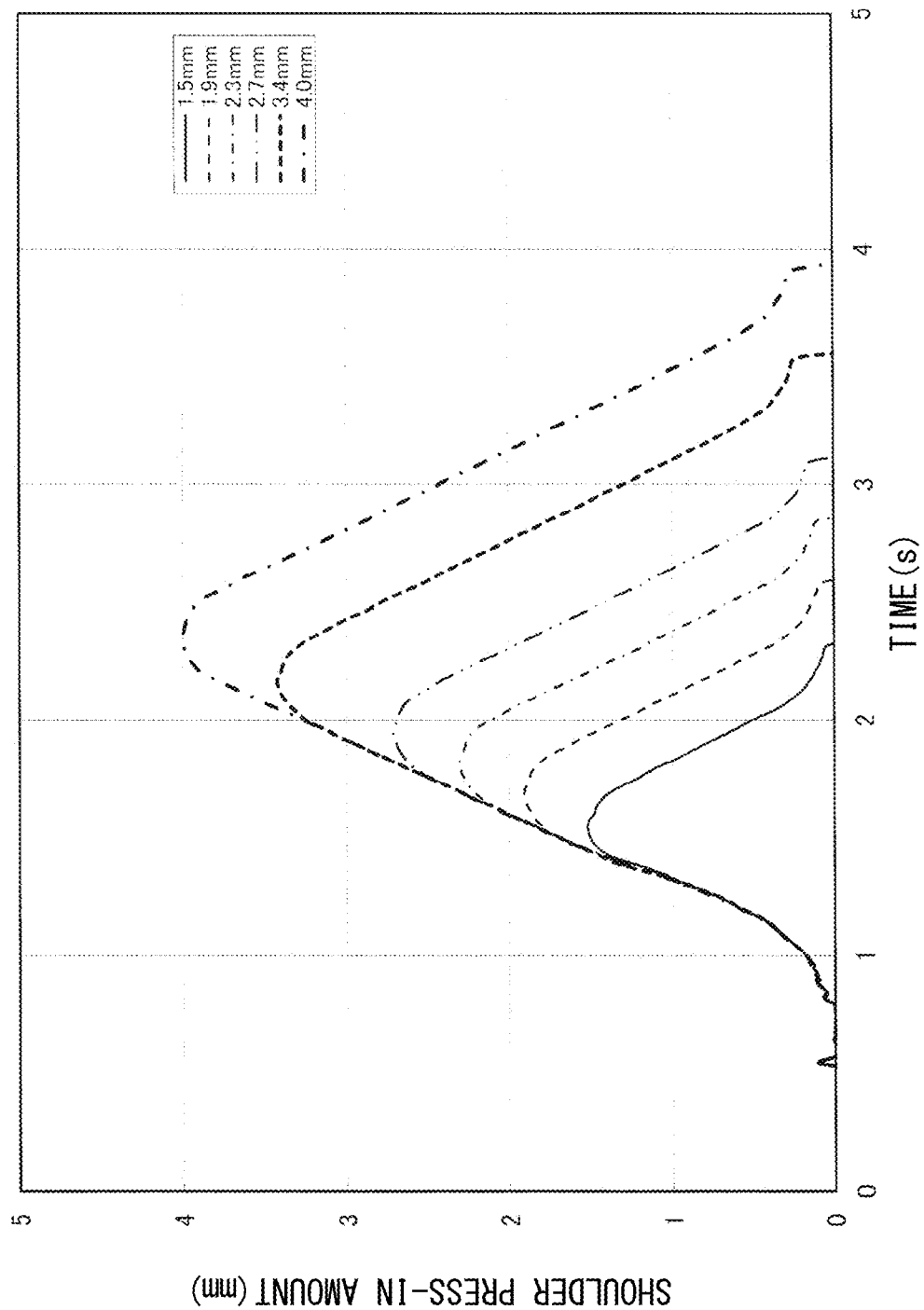
FIG. 14 shows results obtained by plotting the position of the tip surface of the shoulder when the welding test of the workpiece was executed under the conditions of Test Example 4 by using the friction stir spot welder according to Example 2.

Moreover, FIG. 13 shows results obtained by plotting the position of the tip surface of the shoulder when the welding test of the workpiece was executed under the conditions of Test Example 3 by using the friction stir spot welder according to Example 2. FIG. 14 shows results obtained by plotting the position of the tip surface of the shoulder when the welding test of the workpiece was executed under the conditions of Test Example 4 by using the friction stir spot welder according to Example 2.

Furthermore, FIG. 15B shows photographs of sections of the workpieces subjected to the friction stir spot welding under the conditions of Test Example 3 by using the friction stir spot welders according to Example 1, Example 2, and Comparative Example when the first position was set to 2.7 mm. FIG. 15C shows photographs of sections of the workpieces subjected to the friction stir spot welding under the conditions of Test Example 4 by using the friction stir spot welders according to Example 1, Example 2, and Comparative Example when the first position was set to 2.7 mm.

As shown in FIGS. 11 to 14, according to the friction stir spot welders 50 of Examples 1 and 2, even when the thickness of the workpiece 60 (the first workpiece 61 and/or the second workpiece 62) is changed, the press-in speed of the shoulder 12 until the shoulder 12 reaches the first position can be maintained constant.

Moreover, as shown in FIGS. 11 and 13, according to the friction stir spot welders 50 of Examples 1 and 2, even when the first position is set to 2.3 mm with respect to 4.0 mm, i.e., even when the first position is set to a position corresponding to 57.5% of the thickness of the workpiece 60 from the front surface 60c of the workpiece 60, the press-in speed of the shoulder 12 until the shoulder 12 reaches the first position can be maintained constant.

Furthermore, as shown in FIGS. 12 and 14, according to the friction stir spot welders 50 of Examples 1 and 2, even when the first position is set to 2.3 mm with respect to 5.0 mm, i.e., even when the first position is set to a position corresponding to 46.0% of the thickness of the workpiece 60 from the front surface 60c of the workpiece 60, the press-in speed of the shoulder 12 until the shoulder 12 reaches the first position can be maintained constant.

Similarly, as shown in FIG. 13, according to the friction stir spot welder 50 of Example 2, even when the first position is set to 4.0 mm with respect to 4.0 mm, i.e., even when the first position is set to a position corresponding to 100% of the thickness of the workpiece 60 from the front surface 60c of the workpiece 60, the press-in speed of the shoulder 12 until the shoulder 12 reaches the first position can be maintained constant.

Furthermore, as shown in FIG. 13, according to the friction stir spot welder 50 of Example 2, even when the first position is set to 3.4 mm with respect to 4.0 mm, i.e., even when the first position is set to a position corresponding to 85.0% of the thickness of the workpiece 60 from the front surface 60c of the workpiece 60, the press-in speed of the shoulder 12 until the shoulder 12 reaches the first position can be maintained constant.

The above shows that even when the first position is set to a position corresponding to 46% or more of the thickness of the workpiece 60 from the front surface 60c of the workpiece 60, the press-in speed of the shoulder 12 until the shoulder 12 reaches the first position can be maintained constant in the friction stir spot welder 50.

The above also shows that even when the first position is set to a position corresponding to 100% or less of the thickness of the workpiece 60 from the front surface 60c of the workpiece 60, the press-in speed of the shoulder 12 until the shoulder 12 reaches the first position can be maintained constant in the friction stir spot welder 50.

Moreover, as shown in FIGS. 15B and 15C, according to the friction stir spot welders 50 of Examples 1 and 2, the indent amount of the workpiece 60 can be made smaller than that of the friction stir spot welder 50 of Comparative Example.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure. In addition, various inventions can be made by suitable combinations of components disclosed in the above embodiments.

INDUSTRIAL APPLICABILITY

The friction stir spot welder and the friction stir spot welding method according to the present disclosure are useful since even when welding a thick workpiece, the press-in speed of the shoulder can be made constant, and the welding time can be prevented from increasing.

The invention claimed is:

1. A friction stir spot welder comprising:
   a pin that is columnar;
   a shoulder that is cylindrical, the pin being within the shoulder;
   a rotary driver that rotates the pin and the shoulder about an axis that coincides with a center axis of the pin;
   a tool driver that advances and retracts the pin and the shoulder along the axis; and
   circuitry, wherein:
      the circuitry performs an operation (A) of driving the rotary driver and the tool driver such that the pin and the shoulder press a workpiece by a predetermined first pressing force while rotating at a preset and predetermined first rotational frequency;
      after the operation (A), the circuitry performs an operation (B) of driving the rotary driver and the tool driver such that a tip of the shoulder in a rotating state is pressed in to a preset and predetermined first position;
      when the shoulder presses the workpiece by the predetermined first pressing force, surface pressure of a tip surface of the shoulder is 200.71 to 254.65 MPa;
      an area of the tip surface of the shoulder is set to be smaller than 43.98 mm$^2$; and
      a press-in speed of the shoulder until the shoulder reaches the preset and predetermined first position is a constant speed.

2. The friction stir spot welder according to claim 1, wherein:
   the preset and predetermined first position is a position corresponding to 46% or more of a thickness of the workpiece from a front surface of the workpiece.

3. A friction stir spot welding method using:
a pin that is columnar;
a shoulder that is cylindrical, the pin being within the shoulder;
a rotary driver that rotates the pin and the shoulder about an axis that coincides with a center axis of the pin;
a tool driver that advances and retracts the pin and the shoulder along the axis; and
circuitry,
the friction stir spot welding method comprising:
  performing, by the circuitry, an operation (A) of driving the rotary driver and the tool driver such that the pin and the shoulder press a workpiece by a predetermined first pressing force while rotating at a preset and predetermined first rotational frequency; and
  after the operation (A), performing, by the circuitry, an operation (B) of driving the rotary driver and the tool driver such that a tip of the shoulder in a rotating state is pressed in to a preset and predetermined first position, wherein
when the shoulder presses the workpiece by the predetermined first pressing force, surface pressure of a tip surface of the shoulder is 200.71 to 254.65 MPa;
an area of the tip surface of the shoulder is set to be smaller than 43.98 mm$^2$; and
a press-in speed of the shoulder until the shoulder reaches the preset and predetermined first position is a constant speed.

4. The friction stir spot welding method according to claim 3, wherein:
  the preset and predetermined first position is a position corresponding to 46% or more of a thickness of the workpiece from a front surface of the workpiece.

5. The friction stir spot welder according to claim 1, wherein the preset and predetermined first position is a position corresponding to 100% or less of the thickness of the workpiece from the front surface of the workpiece.

6. The friction stir spot welder according to claim 2, wherein the preset and predetermined first position is a position corresponding to 100% or less of the thickness of the workpiece from the front surface of the workpiece.

7. The friction stir spot welding method according to claim 3, wherein the preset and predetermined first position is a position corresponding to 100% or less of the thickness of the workpiece from the front surface of the workpiece.

8. The friction stir spot welding method according to claim 4, wherein the preset and predetermined first position is a position corresponding to 100% or less of the thickness of the workpiece from the front surface of the workpiece.

* * * * *